(12) United States Patent
Nakashima

(10) Patent No.: US 8,863,269 B2
(45) Date of Patent: Oct. 14, 2014

(54) FRONTEND SYSTEM AND FRONTEND PROCESSING METHOD

(75) Inventor: Tsuyoshi Nakashima, Tokyo (JP)

(73) Assignee: NEC Corporation, Tokyo (JP)

( * ) Notice: Subject to any disclaimer, the term of this patent is extended or adjusted under 35 U.S.C. 154(b) by 39 days.

(21) Appl. No.: 13/575,919

(22) PCT Filed: Jan. 21, 2011

(86) PCT No.: PCT/JP2011/051135
§ 371 (c)(1),
(2), (4) Date: Oct. 17, 2012

(87) PCT Pub. No.: WO2011/093228
PCT Pub. Date: Aug. 4, 2011

(65) Prior Publication Data
US 2013/0042317 A1    Feb. 14, 2013

(30) Foreign Application Priority Data

Jan. 29, 2010  (JP) ................... 2010-017960

(51) Int. Cl.
| | | |
|---|---|---|
| G06F 21/00 | (2013.01) | |
| H04L 12/931 | (2013.01) | |
| H04L 29/08 | (2006.01) | |
| H04L 12/803 | (2013.01) | |
| H04L 29/06 | (2006.01) | |

(52) U.S. Cl.
CPC .............. *H04L 69/16* (2013.01); *H04L 49/355* (2013.01); *H04L 67/1002* (2013.01); *H04L 47/125* (2013.01); *H04L 69/22* (2013.01); *H04L 63/0227* (2013.01)

USPC ............ 726/13; 709/227; 709/228; 709/229; 709/230; 709/238

(58) Field of Classification Search
CPC ... H04L 49/355; H04L 69/16; H04L 67/1002; H04L 69/22
USPC .......................................... 726/13
See application file for complete search history.

(56) References Cited

U.S. PATENT DOCUMENTS

| | | |
|---|---|---|
| 7,107,348 B2 | 9/2006 | Shimada et al. |
| 7,433,958 B2 | 10/2008 | Shimada et al. |

(Continued)

FOREIGN PATENT DOCUMENTS

| | | |
|---|---|---|
| CN | 1575462 A | 2/2005 |
| JP | 2007-104700 A | 4/2007 |
| JP | 2007-150641 A | 6/2007 |

OTHER PUBLICATIONS

Scalable Content-aware Request Distribution in Cluster-based Network Servers; Aron et al; proceeding of USENIX Annual Technical conference, Jun. 2000, 15 pages.*

(Continued)

*Primary Examiner* — Jason Lee
(74) *Attorney, Agent, or Firm* — McGinn IP Law Group, PLLC

(57) ABSTRACT

In a frontend system in which a plurality of relay devices is mixed, the performance of end to end can be improved and a network can be flexibly established every policy. Specifically, the L7 (layer 7) processing is unified by providing a Front-End Processor (FEP), which have both a firewall (FW) and a load balancer (LB) recognizing a protocol of the L7 (layer 7) level, near a switch of a gateway to an external network.

28 Claims, 20 Drawing Sheets

(56) References Cited

U.S. PATENT DOCUMENTS

| | | | |
|---|---|---|---|
| 7,689,710 B2* | 3/2010 | Tang et al. | 709/237 |
| 2002/0143955 A1 | 10/2002 | Shimada et al. | |
| 2003/0065944 A1 | 4/2003 | Mao et al. | |
| 2004/0078419 A1* | 4/2004 | Ferrari et al. | 709/201 |
| 2006/0168328 A1 | 7/2006 | Shimada et al. | |
| 2008/0034414 A1* | 2/2008 | Mao et al. | 726/13 |

OTHER PUBLICATIONS

International Search Report in PCT/JP201/051135 dated Mar. 8, 2011 (English Translation Thereof).

"OpenFlow Switch Specification Version 1.0.0 (Wire Protocol 0x01) Dec. 31, 2009" http://www.openflowswitch.org/documents/openflow-spec-v1.0.0.pdf.

"Delegating Network Security With More Information" Jad Naous, Ryan Stutsman, David Mazieres, Nick McKeown, Nickolai Zeldovich. <http://www.scs.stanford.edu/~stutsman/papers/wren27-naous.pdf>.

"Plug-n-Serve: Load-Balancing Web Traffic using OpenFlow" Nikhil Handigol, Srinivasan Seetharaman, Mario Flajslik, Nick McKeown, Ramesh Johari. <http://conferences.sigcomm.org/sigomm/2009/demos/sigcomm-pd-2009-final26.pdf>.

Chinese Office Action of corresponding CN Application No. 201180007734.7, dated May 29, 2014 with an English translation.

* cited by examiner

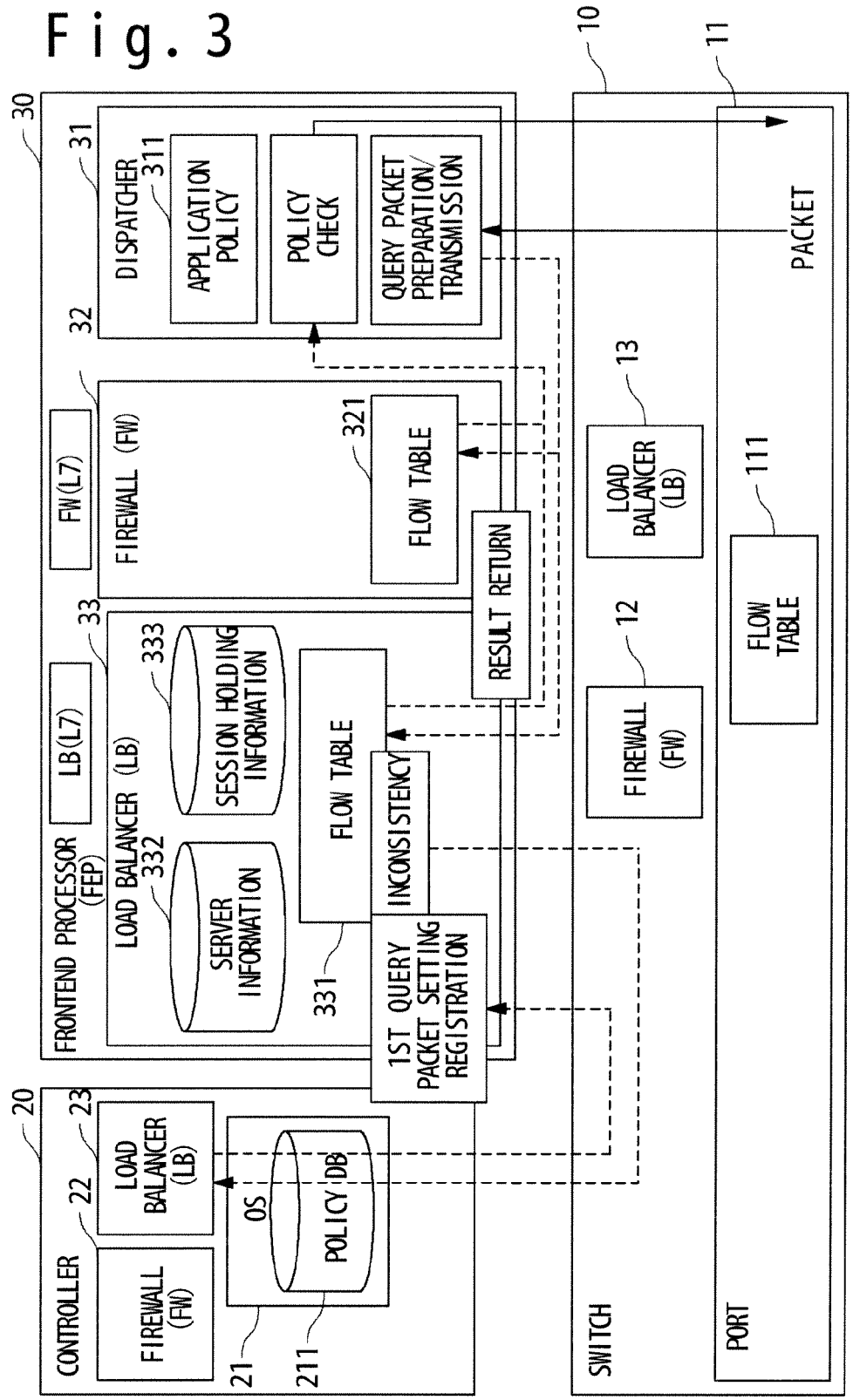

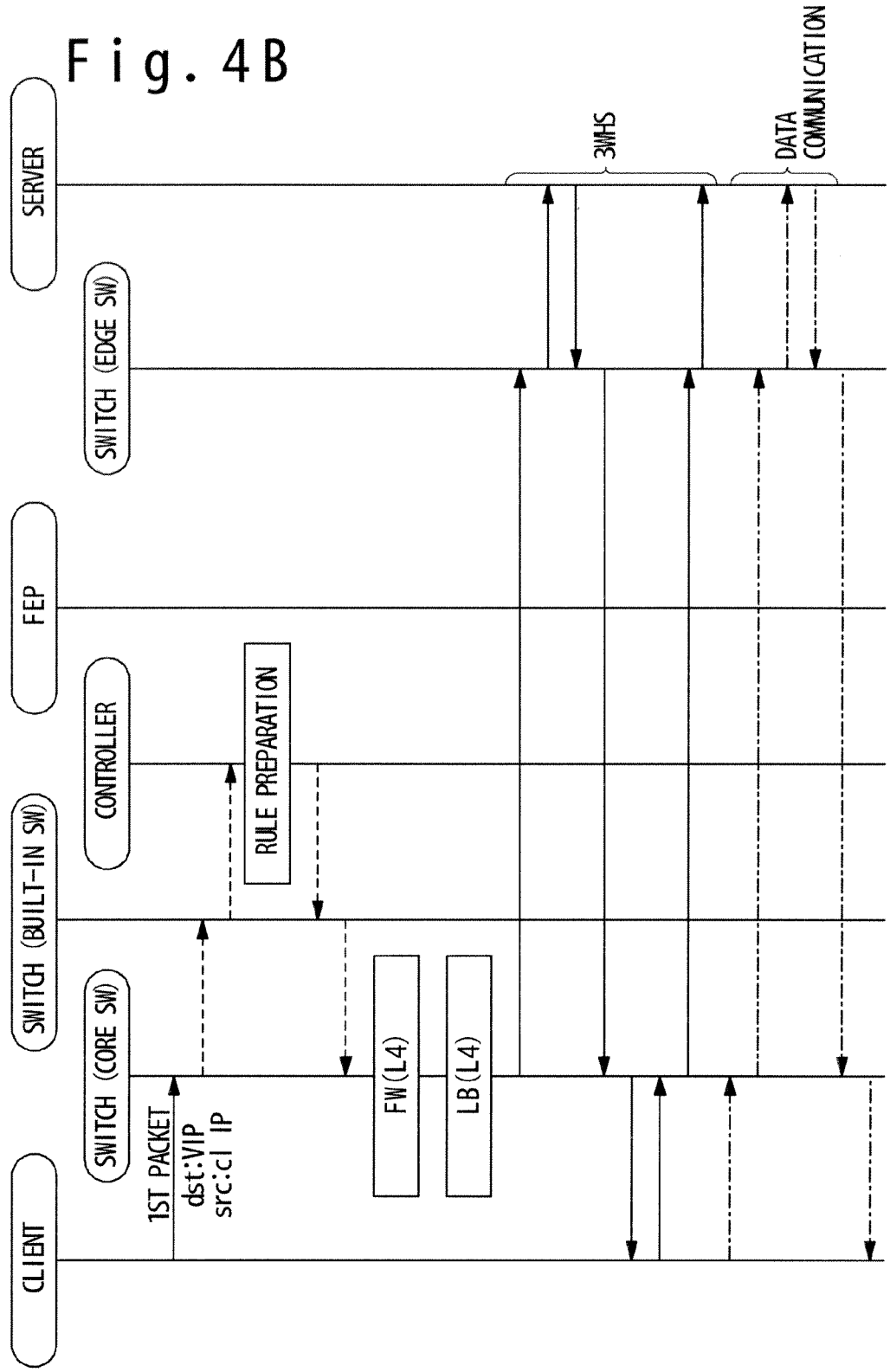

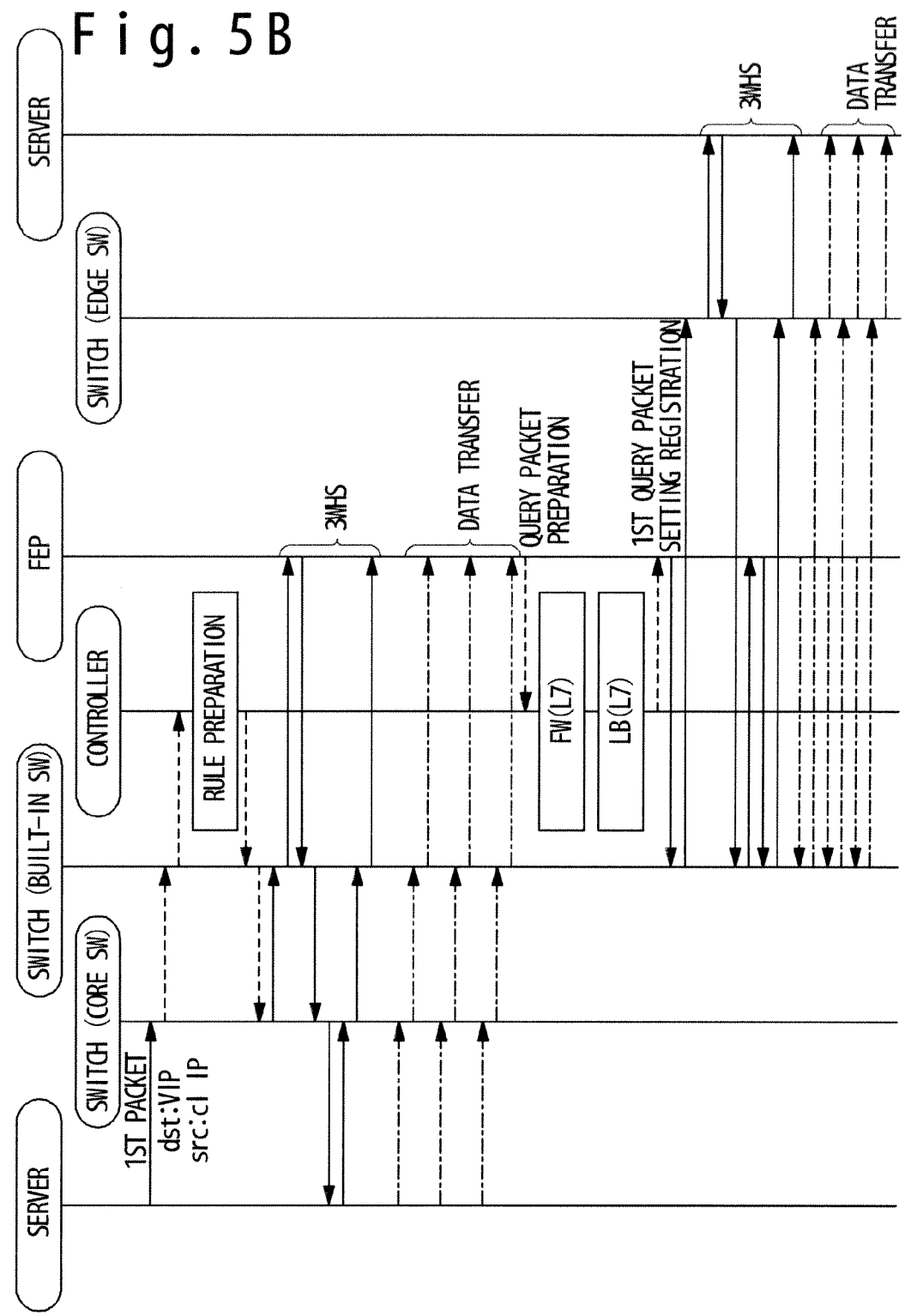

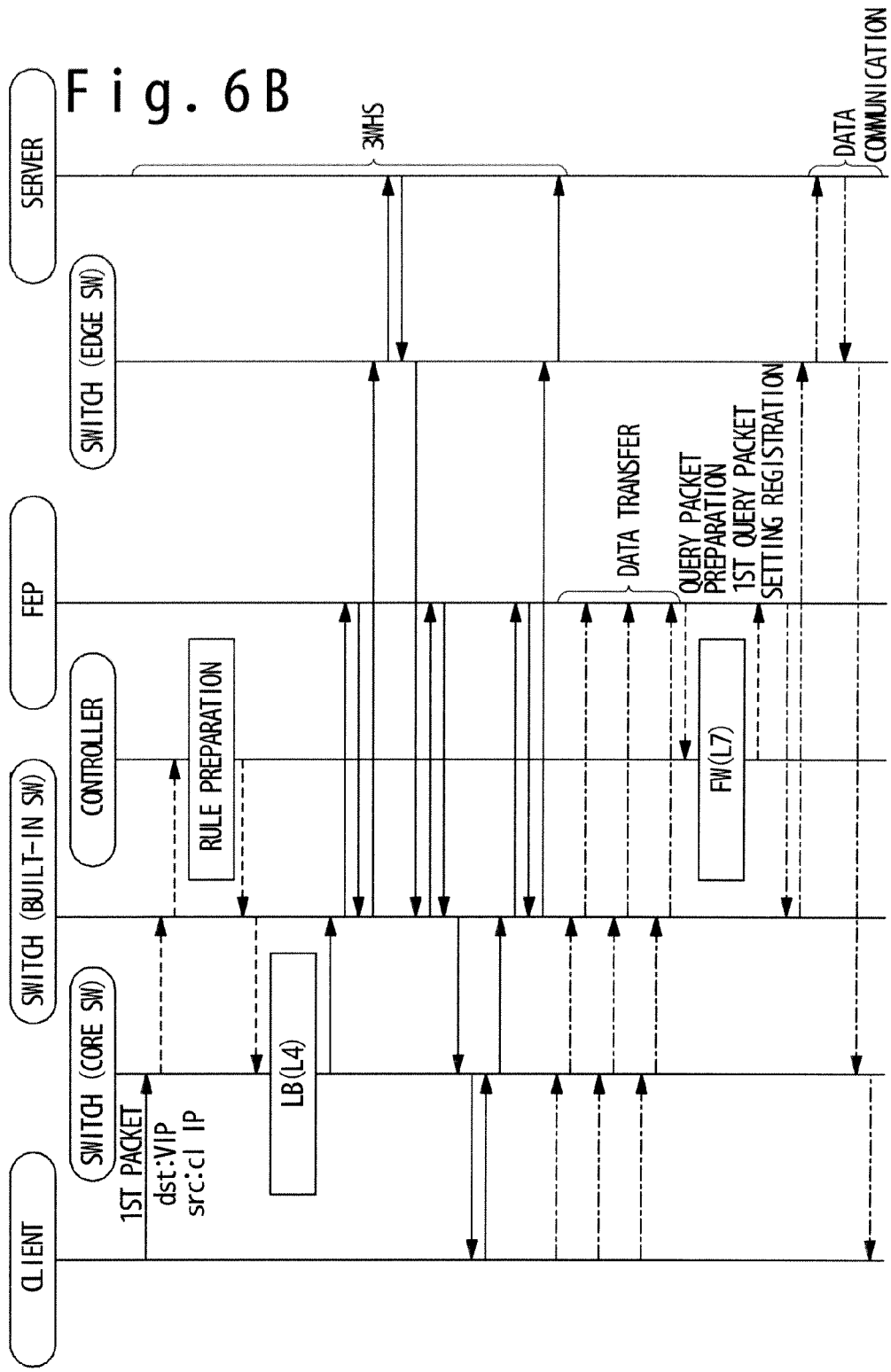

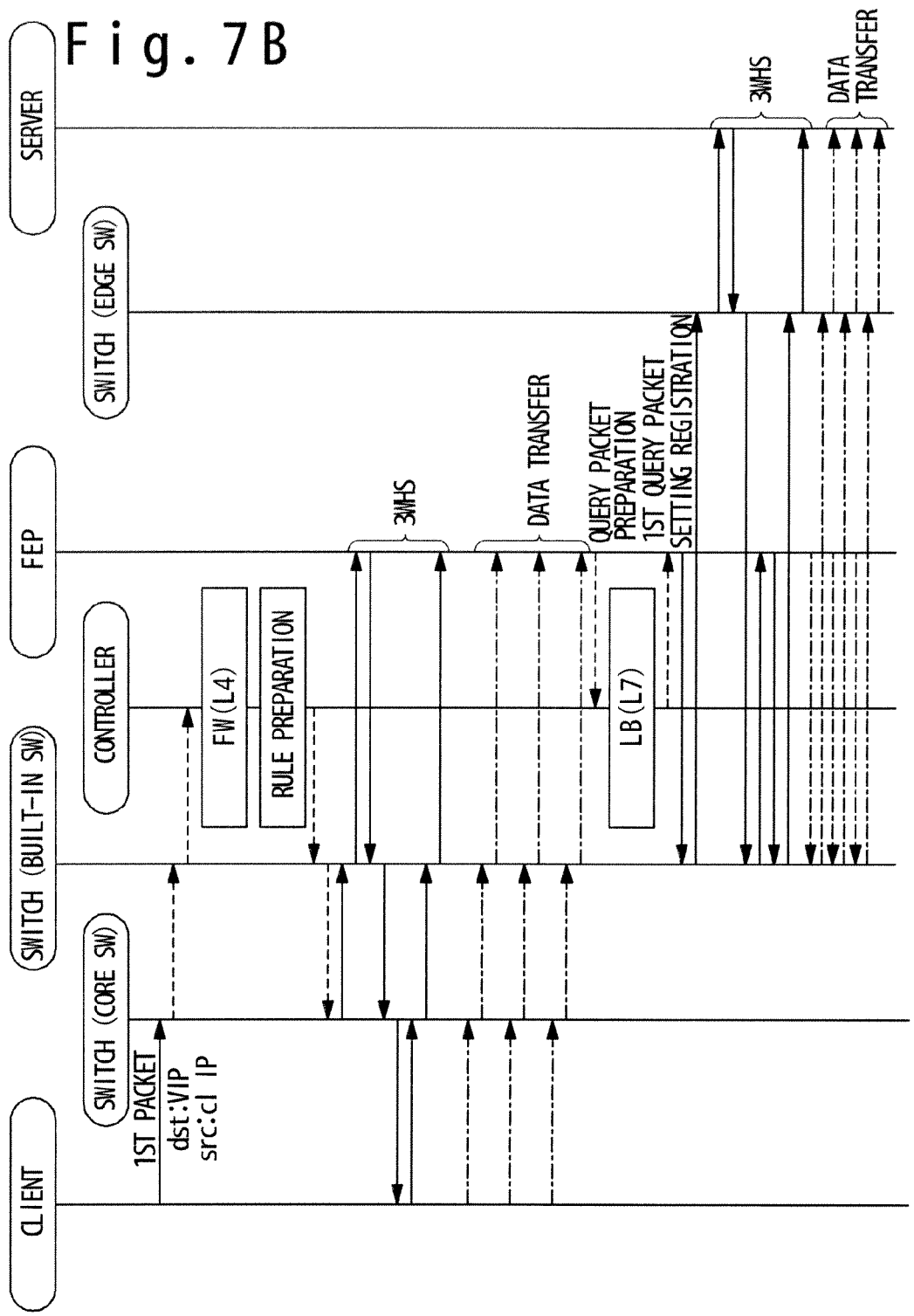

Fig. 8

| FW FUNCTION | LB FUNCTION | PROCESSING OF FEP | REMARK |
|---|---|---|---|
| FW(L4) | — | — | PROCESSABLE BY SWITCH |
| FW(L7) | — | VIA FEP | — |
| — | LB(L4) | — | PROCESSABLE BY SWITCH |
| — | LB(L7) | TERMINATION BY FEP | — |
| FW(L4) | LB(L4) | — | PROCESSABLE BY SWITCH |
| FW(L4) | LB(L7) | TERMINATION BY FEP | — |
| FW(L7) | LB(L4) | VIA FEP | LB (L4) IS PROCESSABLE BY SWITCH |
| FW(L7) | LB(L7) | TERMINATION BY FEP | — |

Fig. 10

IMAGE OF FLOW TABLE

| PROCESSING FLAG | (1) TRANSMISSION SOURCE IP | (2) TRANSMISSION SOURCE PORT | (3) DESTINATION IP | (4) DESTINATION PORT | (5) PAYLOAD | (6) ACTION |
|---|---|---|---|---|---|---|
| ALL | 10.8.45.22 | 1234 | 20.23.99.16 | 5678 | http://xxxx.~.co.jp | PASSAGE |
| (1),(2) | 99.99.99.99 | 3333 | — | — | — | PASSAGE |
| (5) | — | — | — | — | http://yyyy.~.co.jp | DISCARD |
| NONE | — | — | — | — | — | DISCARD |

PRIORITY ORDER OF JUDGMENT
HIGH ⟶ LOW

DETAILED IMAGE http://www.example.com/break_quote.php?text1
=82%$text2=%20onmouseover=alert('xss')%20%82
IF SCRIPT, SQL INJECTION OR THE LIKE IS EMBED, DISCARD.

FRONTEND SYSTEM AND FRONTEND PROCESSING METHOD

TECHNICAL FIELD

The present invention relates to a frontend system and more particularly relates to a frontend system in which a plurality of relay devices are mixed.

BACKGROUND ART

In a network system in an organization such as a company or the like, a routing is performed for recognizing data of the network layer (third layer) or more of the OSI reference model and controlling a destination of a packet on the basis of the data. A switch existing on the foregoing network system is finely categorized for each layer of the OSI reference model supporting. As main categories, there are the L3 switch (layer 3 switch) for reading data of the network layer (third layer), the L4 switch (layer 4 switch) for reading data of the transport layer (fourth layer) and the L7 switch (layer 7 switch) for reading data of the application layer (seventh layer). The L7 switch may be referred to as the application switch.

The L3 switch is a network device in which, as a core device in a LAN (Local Area Network), a transfer function of a packet possessed by a router is made into hardware and its speed is made much higher. The L3 switch evolved from the L2 switch (layer 2 switch) of the conventional switch. The L2 switch is a device for relaying a LAN frame based on a MAC address (Media Access Control Address). On the contrary, the L3 switch concurrently includes a router function for determining a relay destination based on an IP address (Internet Protocol Address). In short, the L3 switch is a device in which the L2 switch and the router are integrated into a single unit.

The L4 switch recognizes a protocol of the transport layer (fourth layer) level such as the TCP (Transmission Control Protocol), the UDP (User Datagram Protocol) and the like, performs an arrangement, an error correction and a retransmission request of data transmitted through the network layer (third layer), and then secures reliability of the data transfer.

The L7 switch can recognize a protocol of the application layer level of the HTTP (HyperText Transfer Protocol), the FTP (File Transfer Protocol) and the like and control a destination based on a specific communication content of a packet.

Also, in the same application layer (seventh layer) as the L7 switch, a bandwidth control device can be used to perform a bandwidth control on a packet. Moreover, at the application layer level, it is possible to limit passage of a packet by using a firewall (FW), perform load balancing by using a load balancer (LB: load balancing device), and perform redundancy processing.

However, in the conventional network configuration in the organization of the company or the like, dedicated appliances are required as the bandwidth control device, the firewall (FW) and the load balancer (LB). Also, in a period between a time when a router received a packet from the Internet and a time when the packet arrived at a terminal, these dedicated appliances perform a bandwidth control for securing the QoS (Quality of Service), an intrusion protection through the firewall (FW) and load balancing, in a step-by-step manner.

For example, as shown in FIG. 1, in the conventional network configuration, the router receives a packet from the Internet (L3), transfers the packet to the bandwidth control device (L7) and transfers the packet to the first L3 switch (L3) in accordance with the bandwidth control executed by the bandwidth control device; the first L3 switch transfers the packet to the firewall (FW) (L7) and transfers the packet to the second L3 switch (L3) if the firewall (FW) allows the intrusion; the second L3 switch transfers the packet to the load balancer (LB) (L7) and transfers the packet to the L2 switch (L2) in accordance with the load balancing executed by the load balancer (LB), and the L2 switch transfers the packet to a terminal under its management.

For this reason, even in the case of the packet received by the L3 switch, since the bandwidth control, the intrusion protection and the load balancing are executed, it is required to refer to the L7 data and to access the L7 switch each time. Consequently, the protocol overhead caused by data copy or the like occurs frequently.

Incidentally, a prior art with regard to the firewall (FW) is disclosed in a non-patent literature 1. Also, a prior art with regard to the load balancer (LB) is disclosed in a non-patent literature 2.

CITATION LIST

Non Patent Literature

[NPL 1] "Delegating Network Security With More Information" Jad Naous, Ryan Stutsman, David Mazieres, Nick McKeown, Nickolai Zeldovich. <http://www.scs.stanford.edu/~stutsman/papers/wren27-n aous.pdf>
[NPL 2] "Plug-n-Serve: Load-Balancing Web Traffic using OpenFlow" Nikhil Handigol, Srinivasan Seetharaman, Mario Flajslik, Nick McKeown, Ramesh Johari. <http://conferences.sigcomm.org/sigomm/2009/demos/sigcomm-pd-2009-final26.pdf>
[NPL 3] "The OpenFlow Switch Consortium"<http://www.openflowswitch.org/>
[NPL 4] "OpenFlow Switch Specification Version 1.0.0 (Wire Protocol 0x01) Dec. 31, 2009"<http://www.openflowswitch.org/documents/openflow-spec-v1.0.0.pdf>

SUMMARY OF INVENTION

An object of the present invention is to provide a frontend system that, as shown FIG. 2, unifies the L7 (layer 7) processing by providing a Front-End Processor (FEP), which have both a firewall (FW) and a load balancer (LB) recognizing a protocol of the L7 (layer 7) level, near a switch of a gateway to an external network.

A frontend system of the present invention includes: a switch configured to relay a packet; a controller configured to determine a new communication route by controlling the switch; a frontend processor configured to be connected through the switch to the controller. The frontend processor includes: a dispatcher; a firewall; and a load balancer. The dispatcher collects the packet, prepares a query packet corresponding to a protocol of a layer 7 level by extracting only necessary information form a collected packet group, performs a policy check on the query packet based on an application policy and transmits the query packet to a destination. The firewall recognizes a protocol of a layer 7 level and determines whether the query packet is allowed to be passed. The load balancer recognizes a protocol of a layer 7 level, performs load balancing of the query packet based on a load state of a network, transmits the query packet to the controller through the switch if the query packet is a first query packet and checks a route of the query packet.

A frontend processing method of the present invention includes: connecting a frontend processor through a switch which relays a packet to a controller which determines a new communication route by controlling the switch; collecting the packet and creating a query packet corresponding to a protocol of a layer 7 level by extracting only necessary information form a collected packet group, by a dispatcher on the frontend processor; determining whether the query packet is allowed to be passed, by a firewall which recognizes a protocol of a layer 7 level on the frontend processor; performing load balancing of the query packet based on a load state of a network, transmitting the query packet to the controller through the switch if the query packet is a first query packet and checking a route of the query packet, by a load balancer which recognizes a protocol of a layer 7 level on the frontend processor; and performing a policy check on the query packet based on an application policy and transmitting the query packet to a destination, by the dispatcher on the frontend processor.

By realizing the unification of the L7 (layer 7) processing, the performance of end to end can be improved and a network can be flexibly established every policy.

BRIEF DESCRIPTION OF DRAWINGS

FIG. 3 is a view showing a basic configuration of a frontend system of the present invention;

FIG. 4B is a data flow view showing a flow of a packet and operations of respective devices in the network system in the case (example 1) of FW (L4), LB (L4);

FIG. 5B is a data flow view showing a flow of a packet and operations of respective devices in the network system in the case (example 2) of FW (L7), LB (L7);

FIG. 6B is a data flow view showing a flow of a packet and operations of respective devices in the network system in the case (example 3) of FW (L7), LB (L4);

FIG. 7B is a data flow view showing a flow of a packet and operations of respective devices in the network system in the case (example 4) of FW (L4), LB (L7);

FIG. 8 is a view showing an image of a combination of an FW function and an LB function;

FIG. 10 is a view showing an image of a flow table;

DESCRIPTION OF EXEMPLARY EMBODIMENTS

<Exemplary Embodiments>

Figure 1:
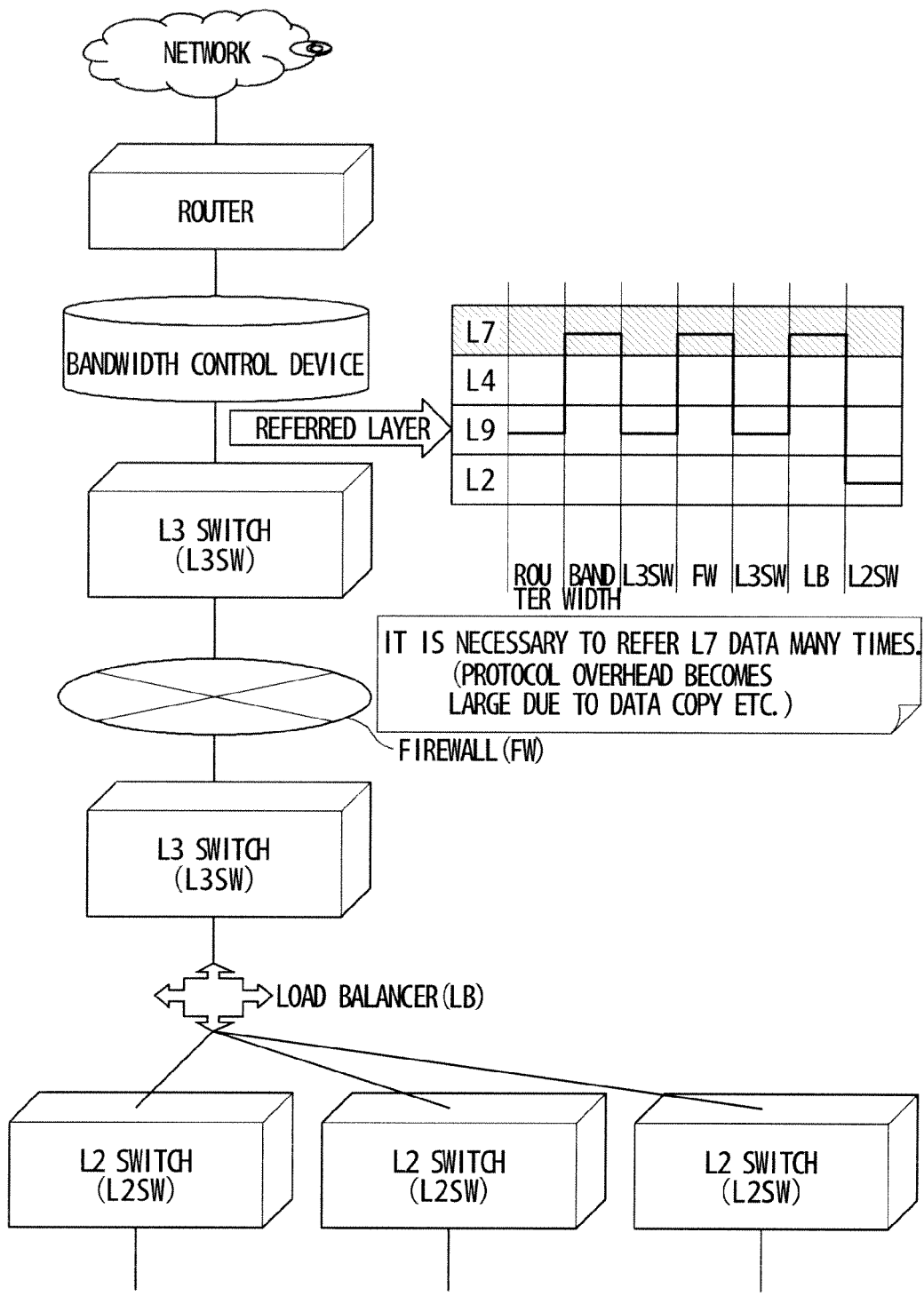
FIG. 1 is a view showing a configuration of a conventional network system (that arranges a dedicated appliance)
Figure 2:
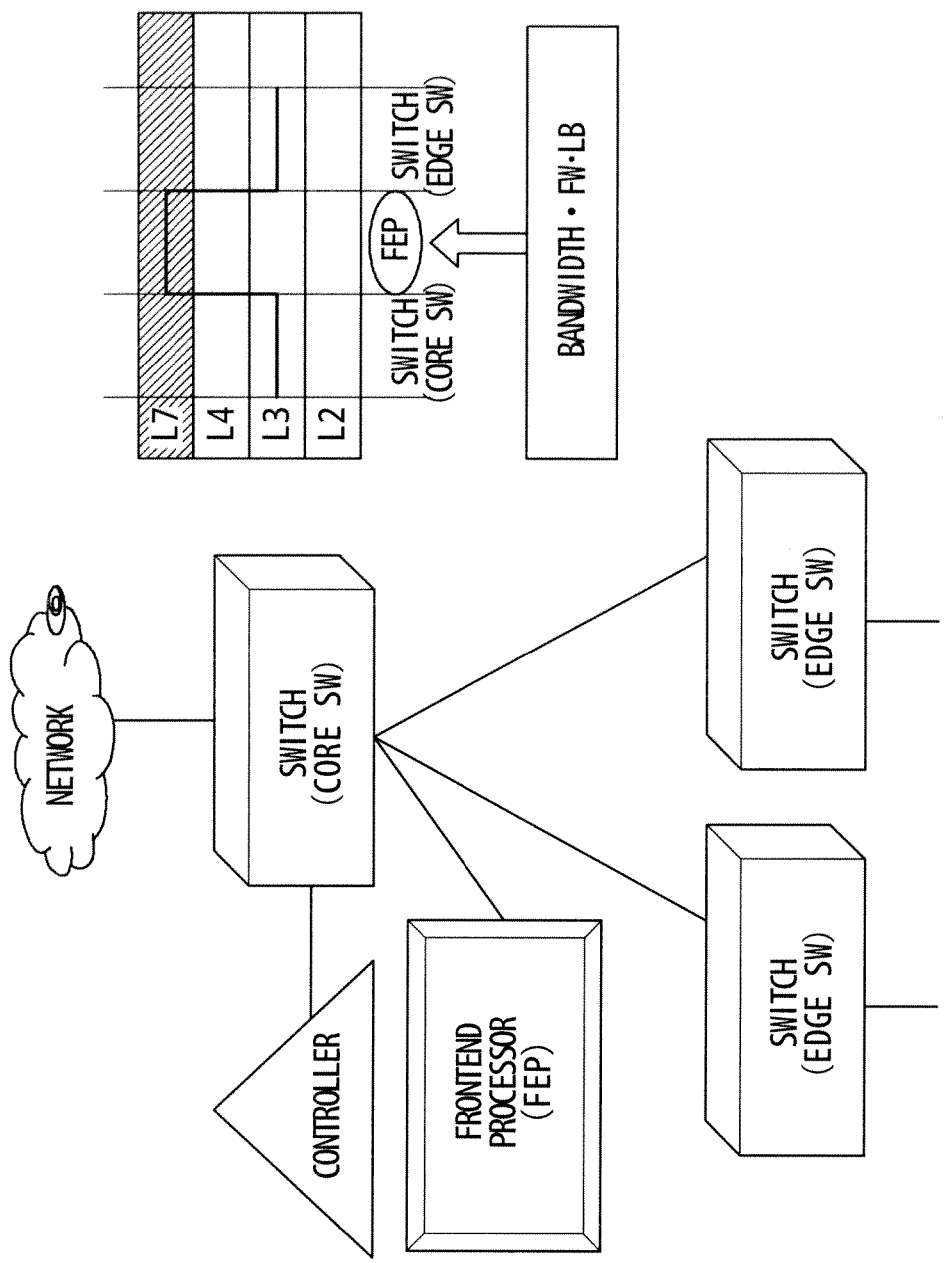
FIG. 2 is a view showing a configuration of a network system according to the present invention.

Exemplary embodiments of the present invention will be described below with reference to the attached drawings.

[Basic Configuration]

As shown in FIG. 3, a frontend system of the present invention includes a switch 10, a controller 20 and a frontend processor (FEP) 30.

The switch 10 includes a port 11, a firewall (FW) 12 and a load balancer (LB) 13.

The port 11 includes a flow table 111.

The controller 20 includes an operating system (OS) 21, a firewall (FW) 22 and a load balancer (LB) 23.

The operating system (OS) 21 includes a policy DB (Database) 211.

The frontend processor (FEP) 30 includes a dispatcher 31, a firewall (FW) 32 and a load balancer (LB) 33.

The dispatcher 31 includes an application policy 311.

The firewall (FW) 32 includes a flow table 321.

The load balancer (LB) 33 includes a flow table 331, server information 332 and session holding information 333.

Incidentally, the firewall (FW) 12 and the firewall (FW) 22 may be configured similarly to the firewall (FW) 32. That is, the firewall (FW) 12 and the firewall (FW) 22 may have the information corresponding to the flow table 321.

Also, the load balancer (LB) 13 and the load balancer (LB) 23 may be configured similarly to the load balancer (LB) 33. That is, the load balancer (LB) 13 and the load balancer (LB) 23 may also have the information corresponding to the flow table 331, the server information 332 and the session holding information 333.

[Detailed Description of Configuration]

Each of the numbers of the switch 10, the controller 20 and the frontend processor (FEP) 30 may be plural.

Here, the controller 20 and the frontend processor (FEP) 30 are connected through the switch 10. Incidentally, the controller 20 and the frontend processor (FEP) 30 may be integrated. When the controller 20 and the frontend processor (FEP) 30 are integrated, the controller 20 and the frontend processor (FEP) 30 can perform a direct communication with each other, without passing through the switch 10.

The port 11 is connected to the controller 20 and the frontend processor (FEP) 30. Also, the port 11 is connected to an external communication device through an external network such as the Internet or the like. Here, the port 11 transfers data between the external communication device, the controller 20 and the frontend processor (FEP) 30.

Each of the firewall (FW) 12, the firewall (FW) 22 and the firewall (FW) 32 has a function for monitoring the data which flows through the boundary with the outside and detecting and blocking an illegal access so as to prevent a third party from intruding into the system through the external network, stealing a glance at, tampering with or destroying data, program or the like.

Each of the load balancer (LB) 13, the load balancer (LB) 23 and the load balancer (LB) 33 has a function for integrally managing (intensively managing) requests from the external network and dispersing and transferring requests into a plurality of servers each having an identical function. Incidentally, as a parallel processing to the load balancing executed by the load balancer (LB), an intrusion prevention system (IPS) can be used to prevent illegal intrusion to a server or a network.

When the controller 20 receives a packet, the operating system (OS) 21 notifies it to functional modules such as the firewall (FW), the load balancer (LB) and the like, in accordance with topology information of the entire network.

The dispatcher 31 assigns the calculation performance of the FEP to an executable process, task or the like. Here, the dispatcher 31 prepares a query packet based on the received packet. Also, the dispatcher 31 looks into load states of its own FEP and the other's FEP, starts up the functional modules such as the firewall (FW), the load balancer (LB) and the like, for the FEP whose load is relatively low, and allocates the prepared query packets. Also, the dispatcher 31 receives the query packets from the function modules such as the firewall (FW), the load balancer (LB) and the like, and performs a policy check on the query packets, and then transmits the query packets to a destination if there is no problem.

Flow entries, which define a predetermined processing (action) that should be performed on the packet complying with a predetermined matching condition (rule), are registered in the flow table 111, the flow table 321 and the flow table 331. A packet group (packet series) complying with the rule is referred to as a flow. The rule of the flow is defined by various combinations in which any or all of a destination address, a source address, a destination port and a source port that are included in a header region of each protocol hierarchy of the packet are used, and this can be distinguished. Incidentally, the above address is assumed to include a MAC address (Media Access Control Address) and an IP address (Internet Protocol Address). Also, in addition to the above, the information of an ingress port can be also used as the rule of the flow. The flow table 321 and the flow table 331 may be identical when they exist in the same frontend processor (FEP) 30.

The detail of the flow table is described in the non-patent literatures 3 and 4.

The policy DB 211 stores the topology information of the entire network.

The application policy 311 stores the topology information for each switch or node. The application policy 311 is set in accordance with the topology information of the policy DB 211.

The server information 332 holds information with regard to a different communication device, which serves as a destination of the packet or query packet and also serves as a target for the establishment of a connection. Here, the server information 332 holds an IP address of a server providing a predetermined service through the network and the like.

The session holding information 333 holds information with regard to a session in a connection established between two communication devices located at both ends of a route passing through the frontend processor (FEP) 30 or between the frontend processor (FEP) 30 and the other communication device. The session indicates a series of operations or communications in a period from the timing of a connection/login to the timing of a disconnection/logoff, in a computer system or network communication.

[Basic Process]

The dispatcher 31 in the frontend processor (FEP) 30 receives a packet from the switch 10. After that, the dispatcher 31 prepares a query packet on the basis of the received packet and transmits the prepared query packet to at least one of the firewall (FW) 32 and the load balancer (LB) 33.

The firewall (FW) 32, when receiving the query packet from the dispatcher 31 or load balancer (LB) 33, refers to the flow table 321 and checks whether or not a flow entry corresponding to the query packet is registered in the flow table 321. If the flow entry corresponding to the query packet is registered in the flow table 321, the firewall (FW) 32 judges whether or not the query packet is made to pass, based on the flow entry. If the query packet is made to pass, the firewall (FW) 32 transmits the query packet to the dispatcher 31 or load balancer (LB) 33. If the query packet is not made to pass, the firewall (FW) 32 discards the query packet. Also, if the flow entry corresponding to the query packet is not registered in the flow table 321, the firewall (FW) 32 judges that the query packet is the 1st (first) query packet and makes the query packet pass and transmits to the dispatcher 31 or load balancer (LB) 33.

The firewall (FW) 33, when receiving a query packet from the dispatcher 31 or firewall (FW) 32, refers to the flow table 331 and checks whether or not a flow entry corresponding to the query packet is registered in the flow table 331. If the flow entry corresponding to the query packet is registered in the flow table 331, the load balancer (LB) 33 performs the load balancing on the query packet based on the flow entry and transmits to the dispatcher 31. If the flow entry corresponding to the query packet is not registered in the flow table 331, the load balancer (LB) 33 judges that the query packet is the 1st query packet and transmits the query packet through the switch 10 to the controller 20. Incidentally, the 1st query packet indicates an unknown query packet that was not previously processed.

The port 11 of the switch 10, when receiving a normal packet or query packet, refers to the flow table 111 and checks whether or not a flow entry corresponding to the received packet is registered in the flow table 111. If the flow entry corresponding to the received packet is registered in the flow table 111, the port 11 processes the packet, based on the flow entry in the flow table 111 for the packet. Also, if a coincident packet is not registered in the flow table 111, the port 11 once transmits the packet to the controller 20. The content in which the port 11 once transmits an unknown packet to the controller 20 may be registered in advance as a flow entry in the flow table 111. Here, the port 11, when receiving the query packet from the frontend processor (FEP) 30, refers to the flow entry 111 and checks whether or not the flow entry corresponding to the query packet is registered in the flow table 111. The query packet is the 1st query packet, and the flow entry corresponding to the query packet is not registered in the flow table 111. Thus, the port 11 transmits the query packet to the controller 20.

The load balancer (LB) 23 in the controller 20, when receiving a query packet through the switch 10 from the frontend processor (FEP) 30, transmits the query packet to the firewall (FW) 22 and the load balancer (LB) 23 and to process it. Also, the load balancer (LB) 23 newly registers a flow entry corresponding to the query packet in the flow table 111 of the port 11, the flow table 331 of the load balancer (LB) 33, and the flow table 321 of the firewall (FW) 32 based on the process result by the load balancer (LB) 23. For example, the load balancer (LB) 23 transmits a control command, which instructs that a flow entry corresponding to the query packet is newly registered in each flow table, to the switch 10 and the frontend processor (FEP) 30. As an example of this control command, a "FlowMod" message that is one of OpenFlow protocol messages for registering an entry in a flow table of a switch from a controller and the like are considered. Incidentally, in the flow table 321 of the firewall (FW) 32, the load balancer (LB) 23 may be designed to indirectly register a flow entry through the load balancer (LB) 33, without directly registering a flow entry. There is no problem if the flow table 321 and the flow table 331 are identical. Moreover, immediately after the flow registration (or simultaneously with the flow registration), the load balancer (LB) 23 returns the query packet through the switch 10 to the load balancer (LB) 33.

The load balancer (LB) 33 in the frontend processor (FEP) 30, when receiving the query packet through the switch 10 from the controller 20, refers to the flow table 331 and checks whether or not a flow entry corresponding to the query packet is registered in the flow table 331. Here, since the load balancer (LB) 23 in the controller 20 already registers the flow entry corresponding to the query packet in the flow table 331, the load balancer (LB) 33 transmits the query packet to the dispatcher 31. At this time, the query packet may be designed to pass through the firewall (FW) 32.

The dispatcher 31 performs a policy check based on the application policy 311 on the query packet. Then, if there is no problem, the dispatcher 31 transmits the query packet to the destination.

[Route 1 of Query Packet: Individual Process of FW Function and LB Function]

A case in which the firewall function (FW function) and the load balancing function (LB function) are used individually (at the parallel process) will be described. In this case, the dispatcher 31 individually transmits the query packet to the firewall (FW) 32 and the load balancer (LB) 23 and individually receives its result from each of them. For this reason, with regard to the route of the query packet, there are the two types of "the dispatcher 31→the firewall (FW) 32→the dispatcher 31" and the dispatcher 31→the load balancer (LB) 23 (→the controller 20→the load balancer (LB) 33: in the case of an inconsistency)→the dispatcher 31". With regard to an order that the query packet passes through those two types, any one of them may be prioritized or they may be simultaneous. Incidentally, when the firewall (FW) 32 discards the query packet, with a message such as "a discard notification from the firewall (FW) 32", "no answer from the firewall (FW) 32" or the like, its fact is grasped by the dispatcher 31, and the processes on and after that are not performed.

[Route 2 of Query Packet: Continuous Process of FW Function and LB Function]

A case in which the firewall function (FW function) and the load balancing function (LB function) are used continuously (at the series process) will be described. In this case, the dispatcher 31 transmits the query packet to any one of the firewall (FW) 32 and the load balancer (LB) 23, the receiving side transmits the query packet to the other (the remaining one) after the processing, and the other (the remaining one) transmits the query packet to the dispatcher 31 after the processing. For this reason, the route of the query packet is represented as "the dispatcher 31→the firewall (FW) 32→the load balancer (LB) 23 (→the controller 20→the load balancer (LB) 23: in the case of an inconsistency)→the dispatcher 31" or "the dispatcher 31→the load balancer (LB) 23 (→the controller 20→the load balancer (LB) 23: in the case of an inconsistency)→the firewall (FW) 32→the dispatcher 31".

[Another Process Example: Change of Basic Process]

Incidentally, the above description describes the example in which the dispatcher 31, transmits the query packet to the firewall (FW) 32 and the load balancer (LB) 23 after preparing the query packet, performs the policy check after receiving the answer, and then transmits to the destination. However, actually, the dispatcher 31 may be designed to perform the policy check immediately after preparing the query packet and then transmit the query packet to the firewall (FW) 32 and the load balancer (LB) 23. In this case, one of the firewall (FW) 32 and the load balancer (LB) 23 transmits the query packet to the destination.

[Hardware Example]

As an example of the switch 10, a relay device such as a router, a switching hub, a gateway, a proxy or the like is considered. As the switch 10, a multi-layer switch may be used.

Also, as examples of the controller 20 and the frontend processor (FEP) 30, a computing machine such as a PC (personal computer), an appliance, a workstation, a mainframe, a supercomputer or the like is considered.

Each of the switch 10, the controller 20 and the frontend processor (FEP) 30 has a communication function. As an example of the hardware to attain the communication function, a network adaptor such as a NIC (Network Interface Card) or the like, a communication device such as an antenna or the like, a communication port such as a connection port (connector) or the like is considered. Also, as an example of the network to connect the respective devices, the Internet, a LAN (Local Area Network), a wireless LAN, a WAN (Wide Area Network), a backbone, a cable television (CATV) line, a fixed-line phone network, a cellular phone network, a WiMAX (IEEE 802.16a), a 3G (3rd Generation), a lease line, an IrDA (Infrared Data Association), a Bluetooth (Registered Trademark), a serial connection line, a data bus or the like is considered.

Incidentally, each of the switch 10, the controller 20 and the frontend processor (FEP) 30 may be a virtual machine (VM) established on a physical machine.

Each of the port 11, the firewall (FW) 12, the load balancer (LB) 13, the operating system (OS) 21, the firewall (FW) 22, the load balancer (LB) 23, the dispatcher 31, the firewall (FW) 32 and the load balancer (LB) 33 is attained by using: a processor operating based on a program and executing a predetermined process; and a memory for storing the program and various data.

As an example of the above processor, a CPU (Central Processing Unit), a microprocessor, a microcontroller, or a semiconductor integrated circuit (IC) having a dedicated function or the like is considered.

As an example of the above memory, a semiconductor storage device such as a RAM (Random Access Memory), a ROM (Read Only Memory), an EEPROM (Electrically Erasable and Programmable Read Only Memory), a flash memory or the like, an auxiliary storage memory such as a HDD (Hard Disk Drive), a SSD (Solid State Drive) or the like, a removable disk such as a DVD (Digital Versatile Disk) or the like, or a storage media such as an SD memory card (Secure Digital memory card) or the like is considered.

Incidentally, the above processor and the above memory may be integrated. For example, in recent years, an all-in one chip of a microcomputer or the like has been advanced. Thus, an example in which one chip microcomputer installed in each of the switch 10, the controller 20 and the frontend processor (FEP) 30 includes the processor and the memory is considered.

However, an actual usage situation is not limited to those examples.

EXAMPLE

The examples of the present invention in various environments will be described below with reference to FIGS. 4A to 7C.

Here, the frontend system of the present invention includes a switch (core SW) 10-1, a switch (built-in SW) 10-2, a switch (edge SW) 10-3, the controller 20, the frontend processor (FEP) 30, a client 100 and a server 200.

Each of the switch (core SW) 10-1, the switch (built-in SW) 10-2 and the switch (edge SW) 10-3 is a kind of the switch 10. The switch (core SW) 10-1, the switch (built-in SW) 10-2 and the switch (edge SW) 10-3 are connected to each other. The switch (core SW) 10-1 is connected to the client 100 through an external network such as the Internet or the like. The switch (built-in SW) 10-2 is connected to the controller 20 and the frontend processor (FEP) 30. The switch (edge SW) 10-3 is connected to the server 200. At this time, the switch (core SW) 10-1, the switch (built-in SW) 10-2 and the switch (edge SW) 10-3 may be integrated.

Incidentally, it is preferable that a position at which the frontend processor (FEP) 30 is arranged is near (hopefully just around) the entrance of the external network and the controller 20. However, this is not essential. That is, the frontend processor (FEP) 30 is preferred to be arranged as close as possible to both of the switch (core SW) 10-1 and the controller 20. Thus, it is further preferable that the controller 20 and the frontend processor (FEP) 30 are integrated.

In the following description, the FW (L4) indicates an environment where the firewall (FW) is driven at an L4 (layer 4) level. The LB (L4) indicates an environment where the load balancer (LB) is driven at the L4 (layer 4) level. The FW (L7) indicates an environment where the firewall (FW) is driven at an L7 (layer 7) level. The LB (L7) indicates an environment where the load balancer (LB) is driven at the L7 (layer 7) level.

The firewall (FW) and the load balancer (LB) perform the process on the usual packet at the L4 (layer 4) level and perform the process on the query packet at the L7 (layer 7) level.

Example 1

Case of FW (L4), LB (L4)

Figure 4A:
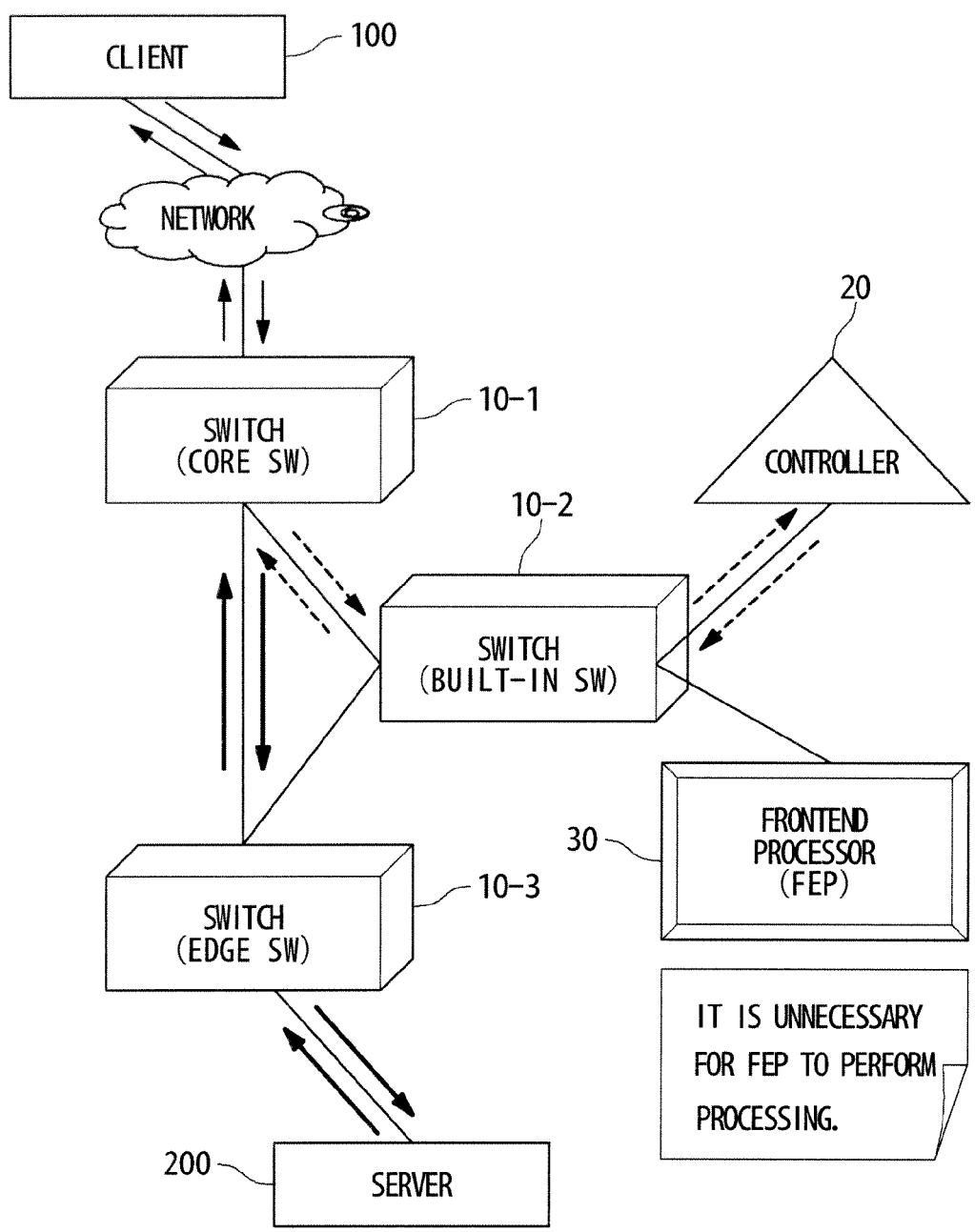
FIG. 4A is a view of a configuration of the network system in a case (example 1) of a firewall: FW (L4) and a load balancer: LB (L4)
Figure 4C:
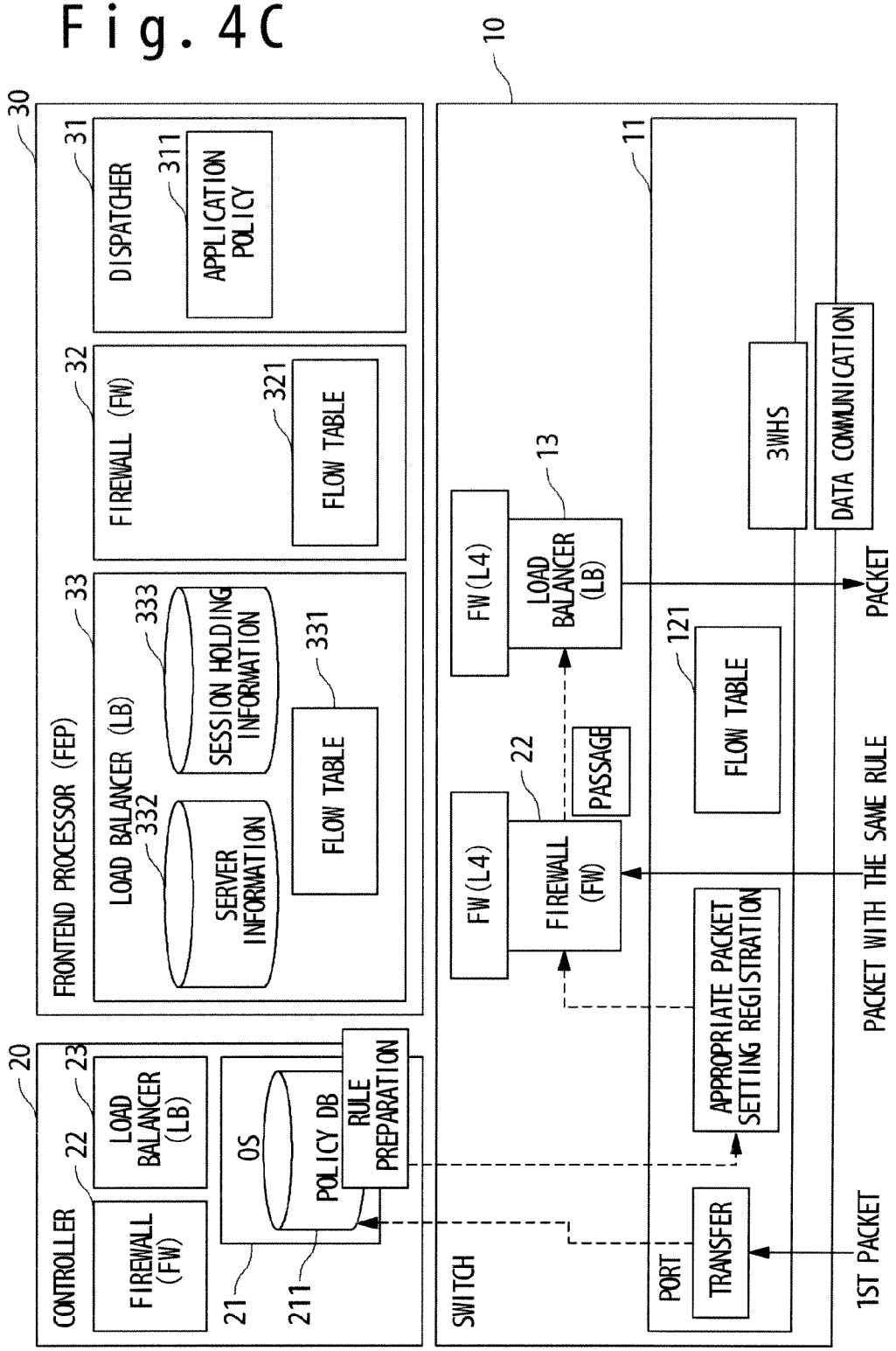
FIG. 4C is a view showing a basic configuration of a frontend system in the case (example 1) of FW (L4), LB (L4)

The case of the FW (L4) and LB (L4) will be described below with reference to FIGS. 4A to 4C.

When both of the firewall (FW) and the load balancer (LB) are driven at the L4 (layer 4) level, the firewall (FW) and the load balancer (LB) are driven on the switch (core SW) 10-1. In this case, a packet transmission to the frontend processor (FEP) is not required.

(1) 1st Packet

The switch (core SW) 10-1, when receiving a packet through the network from the client 100, transfers the packet through the switch (built-in SW) 10-2 to the controller 20 if the packet is the 1st packet. In the packet, a destination address (dst) is a virtual IP address (VIP), and a source address (src) is an IP address (cl IP) of the client 100.

(2) Rule Preparation

The controller 20, when receiving a packet from the switch (core SW) 10-1, refers to the policy DB 211 and determines necessary processing (necessity of processing of the L7 level and the like) on the basis of the virtual IP address (VIP) and prepares a flow entry corresponding to the packet in order to write to the flow table 111. Then, the controller 20 transmits a control command which instructs to newly register the flow entry corresponding to the packet to the flow table 111. After that or at the same time, the controller 20 returns the packet through the switch (built-in SW) 10-2 to the switch (core SW) 10-1.

(3) FW (L4), LB (L4)

The switch (core SW) 10-1 updates the flow table 111, based on the control command from the controller 20. Also, the switch (core SW) 10-1, when receiving a packet returned from the controller 20 or a packet with the same rule as the above returned packet after the update of the flow table 111, transmits the packet to the firewall (FW) 12 and the load balancer (LB) 13. The firewall (FW) 12 recognizes the protocol of the L4 level, refers to an IP header and a TCP header of the packet, and judges whether or not the packet is allowed to pass through. The load balancer (LB) 13 recognizes the protocol of the L4 level and determines a real IP address (an IP address of the server 200) on the basis of the virtual IP address (VIP). At this time, the load balancer (LB) 13 may look into a load state and determine the real IP address (the IP address of the server 200) corresponding to the virtual IP address (VIP).

(4) 3WHS (for Server)

When the packet is not discarded by the firewall (FW) 12 and is sorted into the server 200 by the load balancer (LB) 13, the switch (core SW) 10-1 transmits the packet through the switch (edge SW) 10-3 to the server 200. At this time, the switch (core SW) 10-1 and the server 200 establish a connection by performing the transmission and reception of a packet three times, including the above packet, based on the procedure of the 3WHS (3-Way Hand Shake).

(5) Data Communication

After that, the switch (core SW) 10-1, when receiving the packet with the same rule, transfers the packet through the switch (built-in SW) 10-2 and the switch (edge SW) 10-3 to the server 200.

Example 2

Case of FW (L7), LB (L7)

Figure 5A:
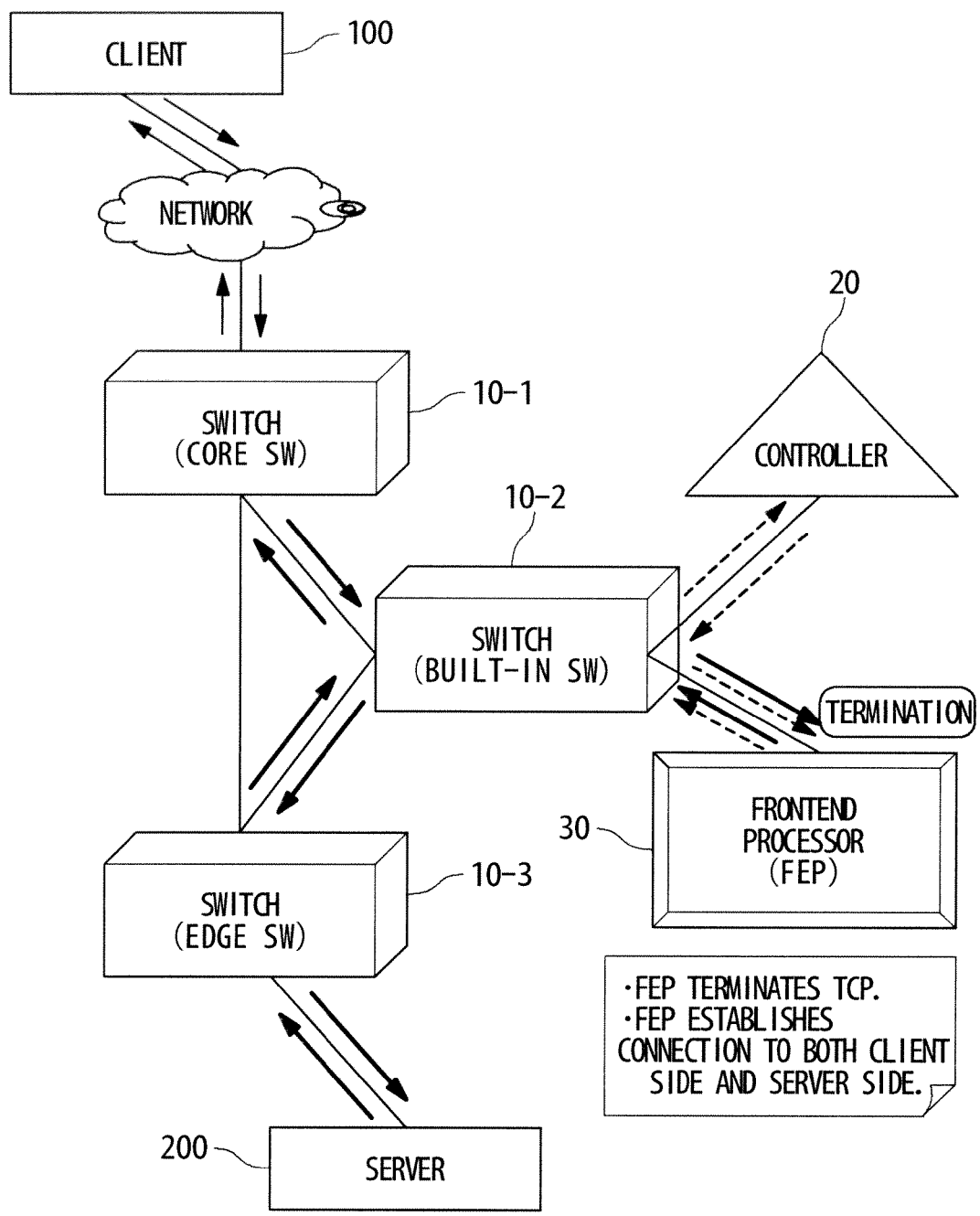
FIG. 5A is a view of a configuration of a network system in a case (example 2) of FW (L7), LB (L7)
Figure 5C:
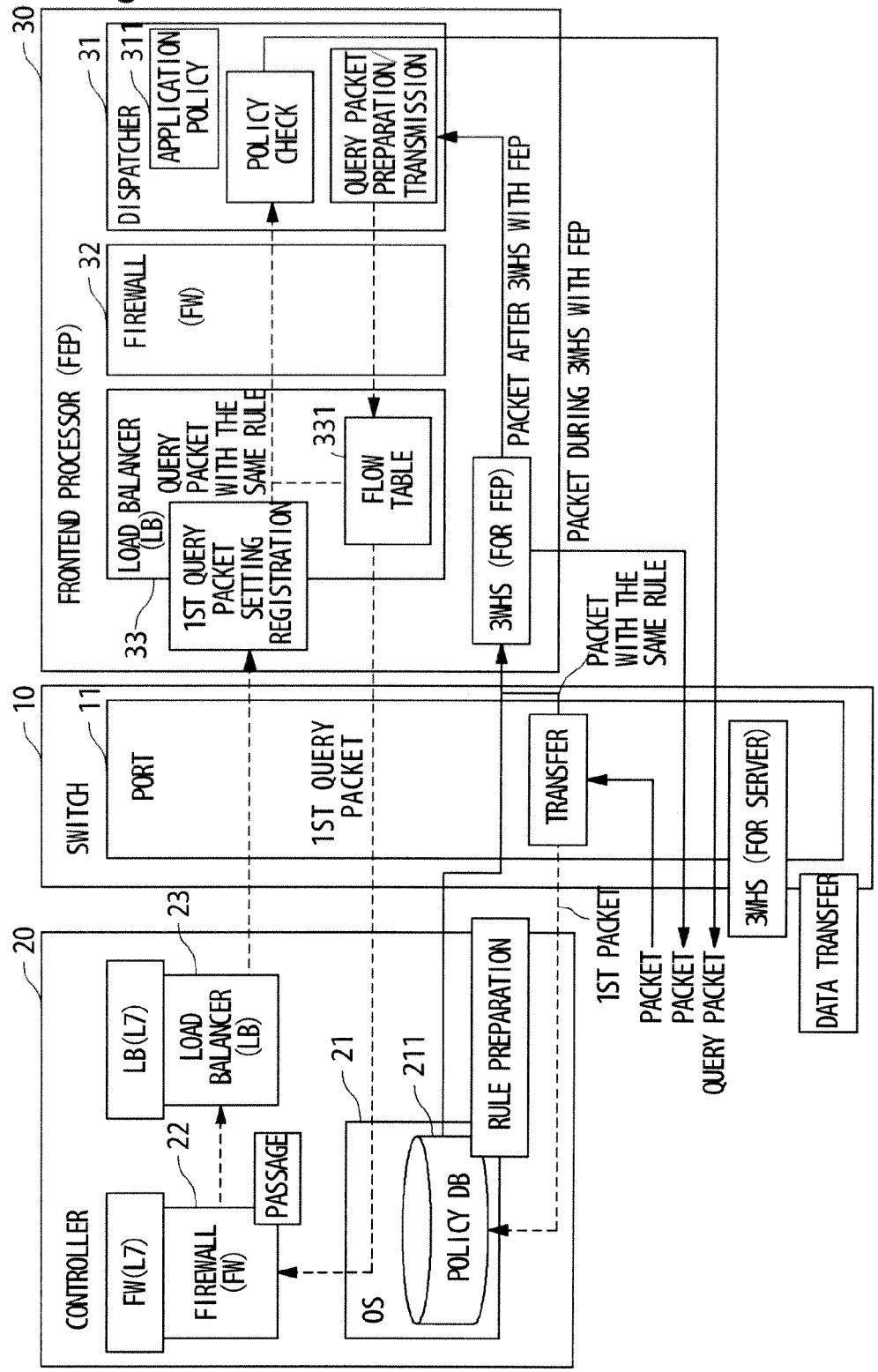
FIG. 5C is a view showing a basic configuration of a frontend system in the case (example 2) of FW (L7), LB (L7)

The case of the FW (L7) and LB (L7) will be described below with reference to FIGS. 5A to 5C.

When both of the firewall (FW) and the load balancer (LB) are driven at the L7 (layer 7) level, the firewall (FW) and the load balancer (LB) are driven on the controller. In this case, the frontend processor (FEP) terminates the session of the TCP. Also, the frontend processor (FEP) establishes a connection to both of the client 100 side and the server 200 side.

(1) 1st Packet

The switch (core SW) 10-1, when receiving a packet through the network from the client 100, transfers the packet through the switch (built-in SW) 10-2 to the controller 20 if the packet is the 1st packet. In the packet, a destination address (dst) is a virtual IP address (VIP), and a source address (src) is an IP address (cl IP) of the client 100.

(2) Rule Preparation

The controller 20, when receiving a packet from the switch (core SW) 10-1, refers to the policy DE 211, determines necessary processing (necessity of processing of the L7 level and the like) on the basis of the virtual IP address (VIP), and prepares a flow entry corresponding to the packet in order to write to the flow table 111. Then, the controller 20 transmits a control command which instructs to newly register the flow entry corresponding to the packet to the flow table 111. After that or at the same time, the controller 20 returns the packet through the switch (built-in SW) 10-2 to the switch (core SW) 10-1.

(3) 3WHS (for FEP)

The switch (core SW) 10-1 updates the flow table 111, based on the control command from the controller 20. Also, the switch (core SW) 10-1 transfers the returned packet through the switch (built-in SW) 10-2 to the frontend processor (FEP) 30. After that, the switch (core SW) 10-1, when receiving a packet with the same rule as the returned packet, transfers the packet through the switch (built-in SW) 10-2 to the frontend processor (FEP) 30, similarly to the returned packet. At this time, the switch (core SW) 10-1 and the frontend processor (FEP) 30 establish a connection by performing the transmission and reception of a packet three times, based on the procedure of the 3WHS (3-Way Hand Shake).

(4) Data Transfer

After the establishment of the connection between the client 100 and the frontend processor (FEP) 30, the frontend processor (FEP) 30 terminates the session of the TCP and receives the packet.

(5) Query Packet Preparation

The frontend processor (FEP) 30 prepares a query packet from the received packet. At this time, when the prepared query packet is the 1st packet, the frontend processor (FEP) 30 transmits the query packet to the controller 20.

(6) FW (L7), LB (L7)

The controller 20, when receiving a query packet, transmits the query packet to the firewall (FW) 22 and the load balancer (LB) 23. The firewall (FW) 22 recognizes the protocol of the L7 level, refers to an IP header and a TCP header of the query packet, and judges whether or not the query packet is allowed to pass through. The load balancer (LB) 23 recognizes the protocol of the L7 level and determines a real IP address (an IP address of the server 200) on the basis of the virtual IP address (VIP). At this time, the load balancer (LB) 23 may look into a load state and determine the real IP address (the IP address of the server 200) corresponding to the virtual IP address (VIP).

(7) 1st Query Packet Setting Registration

When the query packet is not discarded by the firewall (FW) 22 and is sorted into the server 200 that is the destination corresponding to the virtual IP address (VIP) by the load balancer (LB) 23, the controller 20 returns the query packet to the frontend processor (FEP) 30. At this time, the controller 20 prepares a flow entry corresponding to the query packet in order to write to the flow table 321 and the flow table 331. Then, the controller 20 transmits a control command which instructs to newly register the flow entry corresponding to the query packet to the flow table 321 and the flow table 331. The frontend processor (FEP) 30 updates the flow table 321 and the flow table 331 based on the control command from the controller 20.

(8) 3WHS (for Server)

Also, the frontend processor (FEP) 30 transmits the returned query packet through the switch (built-in SW) 10-2 and the switch (edge SW) 10-3 to the server 200. At this time, the frontend processor (FEP) 30 and the server 200 establish a connection by performing the transmission and reception of a query packet three times, based on the procedure of the 3WHS (3-Way Hand Shake).

(9) Data Transfer

After that, the frontend processor (FEP) 30, when preparing a query packet with the same rule, transfers the query packet through the switch (built-in SW) 10-2 and the switch (edge SW) 10-3 to the server 200.

Example 3

Case of FW (L7), LB (L4)

Figure 6A:
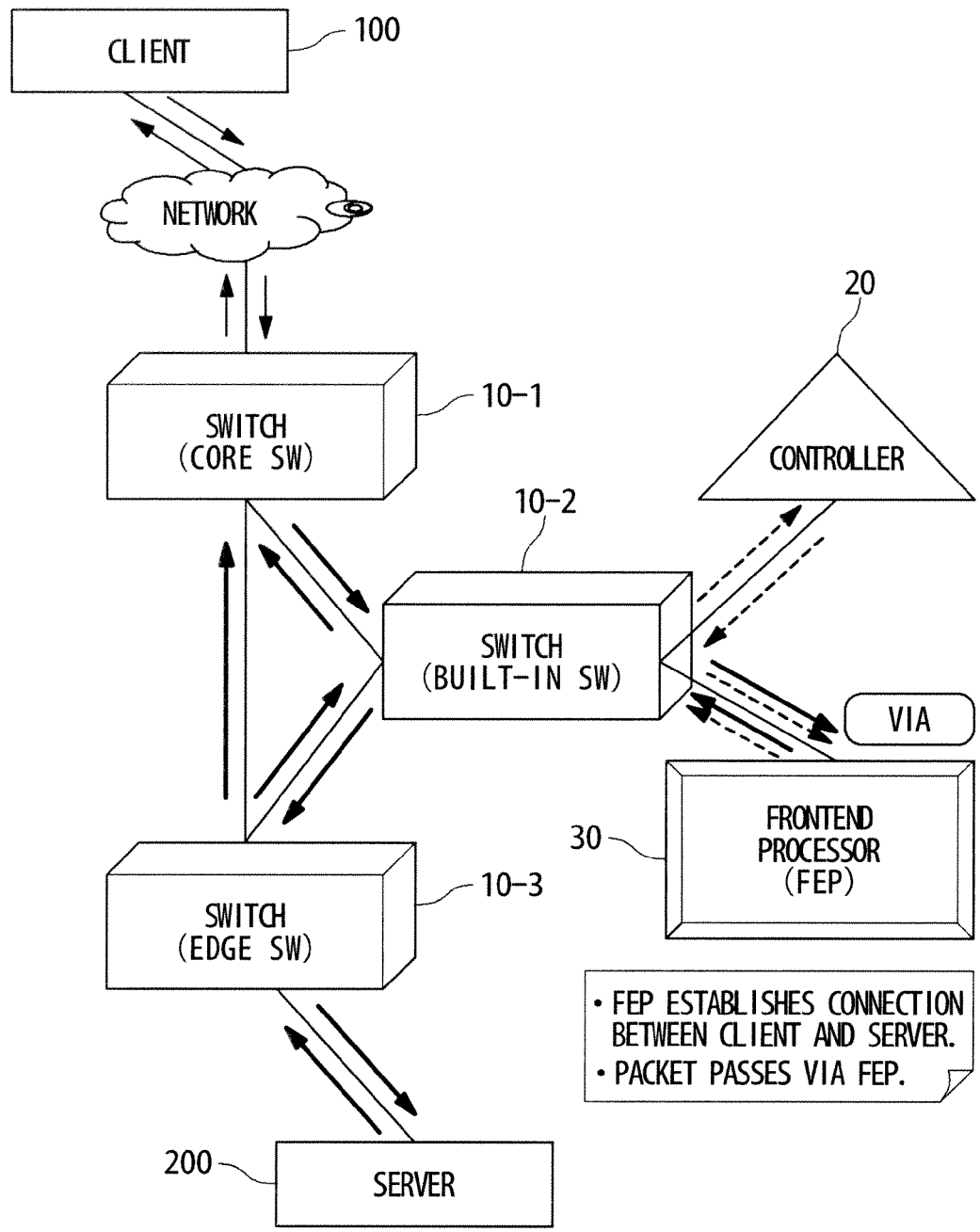
FIG. 6A is a view of a configuration of a network system in a case (example 3) of FW (L7), LB (L4)
Figure 6C:
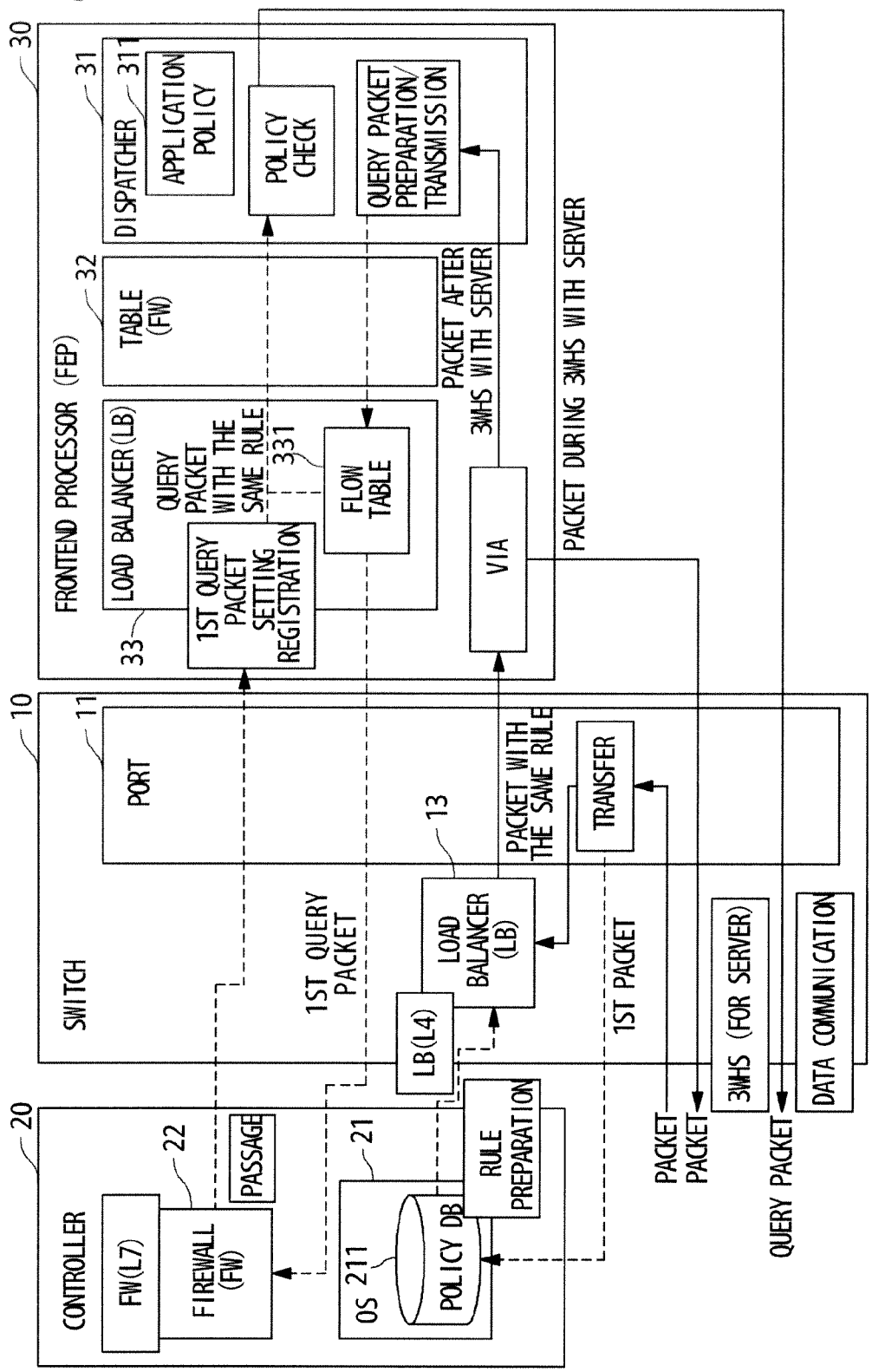
FIG. 6C is a view showing a basic configuration of a frontend system in the case (example 3) of FW (L7), LB (L4)

The case of the FW (L7) and LB (L4) will be described below with reference FIGS. 6A to 6C.4

When the firewall (FW) is driven on the L7 (layer 7) level and the load balancer (LB) is driven on the L4 (layer 4) level, the firewall (FW) is driven on the controller, and this load balancer (LB) is driven on the switch (core SW) 10-1. In this case, the frontend processor (FEP) does not terminate the session of the TCP. Also, although a connection is established between the client 100 and the server 200, the packet is passed through the frontend processor (FEP).

(1) 1st Packet

The switch (core SW) 10-1, when receiving a packet through the network from the client 100, transfers the packet through the switch (built-in SW) 10-2 to the controller 20 if the packet is the 1st packet. In the packet, a destination address (dst) is a virtual IP address (VIP), and a source address (src) is an IP address (cl IP) of the client 100.

(2) Rule Preparation

The controller 20, when receiving the packet from the switch (core SW) 10-1, refers to the policy DB 211, determines necessary processing (necessity of processing of the L7 level and the like) on the basis of the virtual IP address (VIP), and prepares a flow entry corresponding to the packet in order to write to the flow table 111. Then, the controller 20 transmits a control command which instructs to newly register the flow entry corresponding to the packet, to the flow table 111. After that or at the same time, the controller 20 returns the packet through the switch (built-in SW) 10-2 to the switch (core SW) 10-1.

(3) LB (L4)

The switch (core SW) 10-1 updates the flow table 111 based on the control command from the controller 20. Also, the switch (core SW) 10-1, when receiving a packet returned from the controller 20 or a packet with the same rule as the above returned packet after the update of the flow table 111, transmits the packet to the load balancer (LB) 13. The load balancer (LB) 13 recognizes the protocol of the L4 level, determines a real IP address (an IP address of the server 200) on the basis of the virtual IP address (VIP), and changes a route of the packet to a route through the frontend processor (FEP) 30. For example, in the case of the LB (L4), on the basis of an algorism (a round robin, a minimum response time and the like) specified by a user setting, a server (one of a plurality of servers) of a dispersion target is determined, and a path (flow entry) between the client and the FEP and between the FEP and the server is set. At this time, the load balancer (LB) 13 may look into the load state and determine the real IP address (the IP address of the server 200) corresponding to the virtual IP address (VIP).

(4) 3WHS (for Server)

The switch (core SW) 10-1 transmits the packet through the switch (built-in SW) 10-2, the frontend processor (FEP) 30 and the switch (edge SW) 10-3 to the server 200 and transmits an answer from the server 200 to the client 100. Also, the switch (core SW) 10-1 transfers the packet with the same rule through the switch (built-in SW) 10-2, the frontend processor (FEP) 30 and the switch (edge SW) 10-3 to the server 200. At this time, the switch (core SW) 10-1 relays the packet based on the procedure of the 3WHS (3-Way Hand Shake) and establishes a connection between the client 100 and the server 200 by performing the transmission and reception of the packet three times, including the 1st packet, between the client 100 and the server 200.

(5) Data Transfer

The frontend processor (FEP) 30, when establishing the connection between the client 100 and the server 200, receives the packet passed through the frontend processor (FEP) 30.

(6) Query Packet Preparation

The frontend processor (FEP) 30 prepares a query packet from the received packet. At this time, when the prepared query packet is the 1st packet, the frontend processor (FEP) 30 transmits the query packet to the controller 20.

(7) FW (L7)

The controller 20, when receiving the query packet, transmits the query packet to the firewall (FW) 22. The firewall (FW) 22 recognizes the protocol of the L7 level, refers to an IP header and a TCP header of the query packet and judges whether or not the query packet is allowed to pass through.

(8) 1st Query Packet Setting Registration

When the query packet is not discarded by the firewall (FW) 22, the controller 20 returns the query packet to the frontend processor (FEP) 30. At this time, the controller 20 prepares a flow entry corresponding to the query packet in order to write to the flow table 321 and the flow table 331. Then, the controller 20 transmits a control command which instructs to newly register the flow entry corresponding to the query packet, to the flow table 321 and the flow table 331. The frontend processor (FEP) 30 updates the flow table 321 and the flow table 331 based on the control command from the controller 20.

(9) Data Communication

Also, the frontend processor (FEP) 30 transmits the query packet returned from the controller 20 and the query packet with the same rule through the switch (built-in SW) 10-2 and the switch (edge SW) 10-3 to the server 200. Incidentally, the answer from the server 200 may not be passed via the frontend processor (FEP) 30.

Example 4

Case of FW (L4), LB (L7)

Figure 7A:
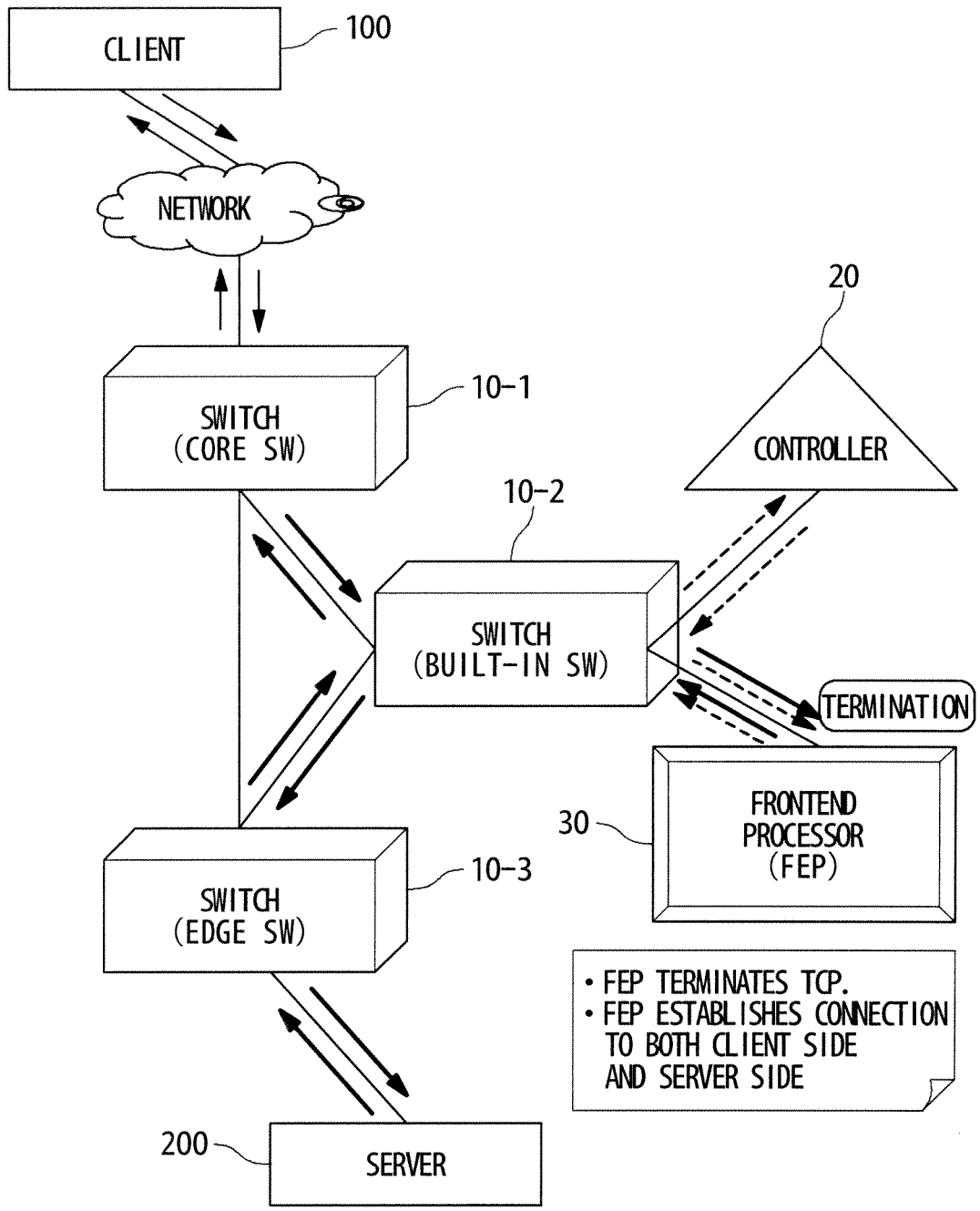
FIG. 7A is a view of a configuration of a network system in a case (example 4) of FW (L4), LB (L7)
Figure 7C:
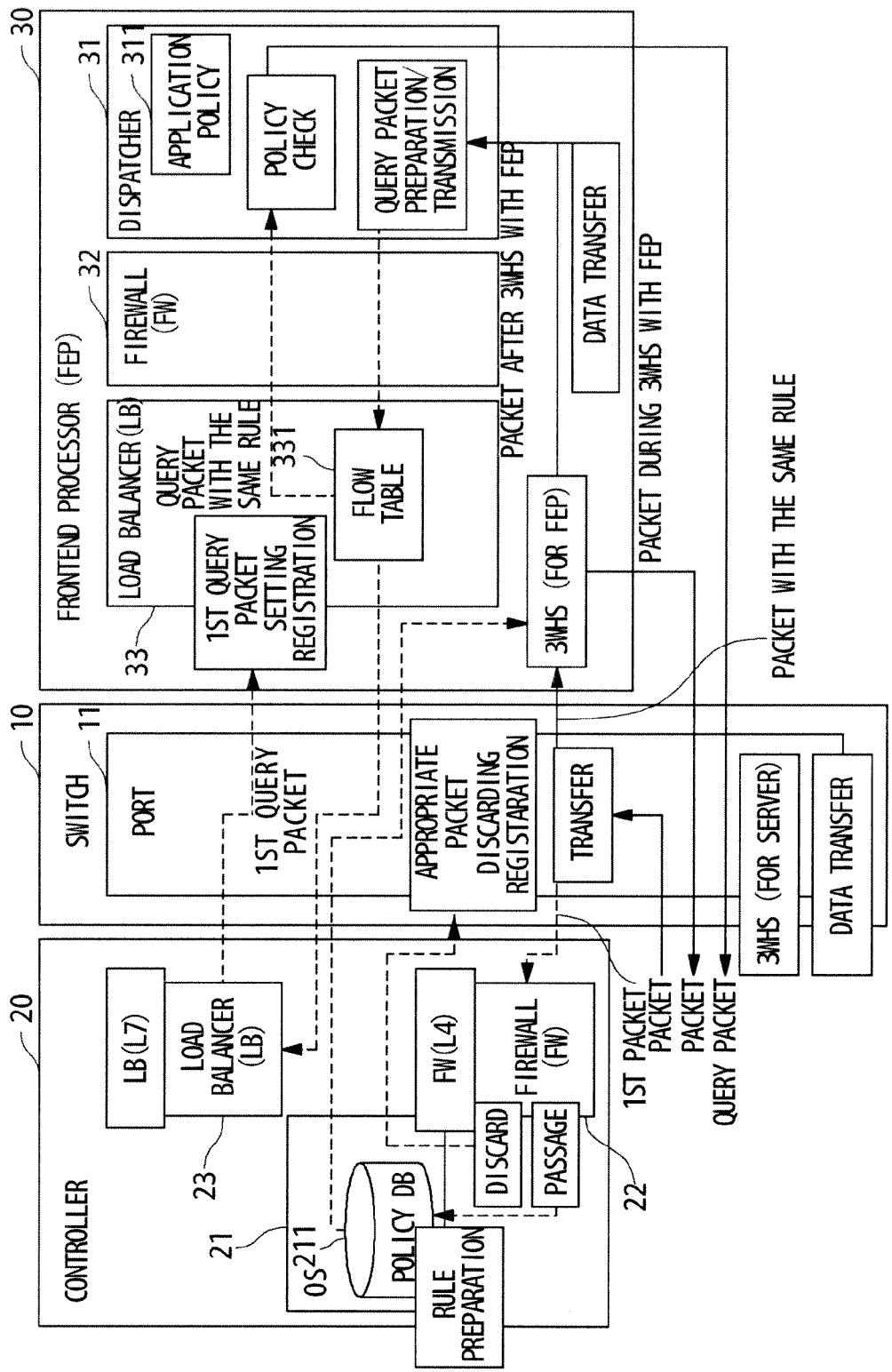
FIG. 7C is a view showing a basic configuration of a frontend system in the case (example 4) of FW (L4), LB (L7)

The case of the FW (L4) and LB (L7) will be described below with reference to FIGS. 7A to 7C.

When the firewall (FW) is driven at the L4 (layer 4) level and the load balancer (LB) is driven at the L7 (layer 7) level, the firewall (FW) and the load balancer (LB) are driven on the controller. In this case, the frontend processor (FEP) terminates the session of the TCP. Also, the frontend processor (FEP) establishes a connection to both of the client 100 side and the server 200 side. Incidentally, actually, the firewall (FW) may be driven on the switch (core SW) 10-1. The operation in this case is equal to the operation of the firewall (FW) in the example 1.

(1) 1st Packet

The switch (core SW) 10-1, when receiving a packet through the network from the client 100, transfers the packet through the switch (built-in SW) 10-2 to the controller 20 if the packet is the 1st packet. In the packet, a destination address (dst) is a virtual IP address (VIP), and a source address (src) is an IP address (cl IP) of the client 100.

(2) FW (L4)

The controller 20, when receiving a packet from the switch (core SW) 10-1, transmits the packet to the firewall (FW) 22. The firewall (FW) 22 recognizes the protocol of the L4 level, refers to an IP header and a TCP header of the packet, and judges whether or not the packet is allowed to pass through.

(3) Rule Preparation

When the packet is not discarded by the firewall (FW) 22, the controller 20 refers to the policy DB 211, determines necessary processing (necessity of processing of the L7 level and the like) on the basis of the virtual IP address (VIP), and prepares a flow entry corresponding to the packet in order to write to the flow table 111. The controller 20 transmits a control command which instructs to newly register the flow entry corresponding to the packet, in the flow table 111. After that or at the same time, the controller 20 returns the packet through the switch (built-in SW) 10-2 to the switch (core SW) 10-1. Also, when the packet is discarded by the firewall (FW) 22, the controller 20 transmits a control command which instructs to newly register a flow entry to discard a packet with the same rule as the packet, to the flow table 111. Incidentally, when the flow entry to discard the packet with the same rule as the 1st packet is registered in the flow table 111, the switch (core SW) 10-1 discards all of subsequent packets with the same rule without transferring. That is, the processing on and after that is not performed.

(4) 3WHS (for FEP)

The switch (core SW) 10-1 updates the flow table 111, based on the control command from the controller 20. After that, the switch (core SW) 10-1 transfers the returned packet through the switch (built-in SW) 10-2 and the controller 20 to the frontend processor (FEP) 30 and transmits an answer from the frontend processor (FEP) 30 to the client 100. Also, the switch (core SW) 10-1, when receiving the packet with the same rule, similarly transfers through the switch (built-in SW) 10-2 to the frontend processor (FEP) 30. At this time, the switch (core SW) 10-1 and the frontend processor (FEP) 30 establish a connection by performing the transmission and reception of the packet, three times, based on the procedure of the 3WHS (3-Way Hand Shake).

(5) Data Transfer

After the establishment of the connection between the client 100 and the frontend processor (FEP) 30, the frontend processor (FEP) 30 terminates the session of the TCP and receives the packet.

(6) Query Packet Preparation

The frontend processor (FEP) 30 prepares the query packet from the received packet and transmits the query packet to the controller 20.

(7) LB (L7)

The controller 20, when receiving a query packet, transmits the query packet to the load balancer (LB) 23. The load balancer (LB) 23 recognizes the protocol of the L7 level and determines the real IP address (the IP address of the server 200) on the basis of the virtual IP address (VIP). At this time, the load balancer (LB) 23 may look into a load state and determine the real IP address (the IP address of the server 200) corresponding to the virtual IP address (VIP). When the query packet is sorted into the server 200 that is the destination corresponding to the virtual IP address (VIP) by the load balancer (LB), the controller 20 returns the query packet to the frontend processor (FEP) 30.

(8) 1st Packet Setting Registration

At this time, the controller 20 prepares a flow entry corresponding to the query packet in order to write to the flow table 321 and the flow table 331. Then, the controller 20 transmits a control command which instructs to newly register the flow entry corresponding to the query packet, to the flow table 321 and the flow table 331. The frontend processor (FEP) 30 updates the flow table 321 and the flow table 331, based on the control command from the controller 20.

(9) 3WHS (for Server)

Also, the frontend processor (FEP) 30, after registering the returned query packet in the flow entry, transmits the returned query packet through the switch (built-in SW) 10-2 and the switch (edge SW) 10-3 to the server 200. At this time, the frontend processor (FEP) 30 and the server 200 establish a connection by performing the transmission and reception of the query packet three times, based on the procedure of the 3WHS (3-Way Hand Shake).

(10) Data Transfer

After that, the frontend processor (FEP) 30, when preparing a query packet with the same rule, transfers the query packet through the switch (built-in SW) 10-2 and the switch (edge SW) 10-3 to the server 200.

[Combination of FW Function and LB Function]

The combination of the firewall (FW) function and the load balancer (LB) function will be described below with reference to FIG. 8.

In application policy, when the firewall (FW), the load balancer (LB) or both of them are driven on the L4 (layer 4) level, they can be processed on the switch 10.

When the load balancer (LB) is driven on the L7 (layer 7) level, the session of the TCP is designed to be terminated at the frontend processor (FEP). This is intended to prepare the query packet and perform the load balancing on the query packet.

When the firewall (FW) is driven on the L7 (layer 7) level except the above case, the packet is designed to pass through the frontend processor (FEP). This is because the query packet is required to be prepared. At this time, when the load balancer (LB) is driven on the L4 (layer 4) level, the load balancer (LB) function can be processed on the switch 10.

Incidentally, the controller 20 can execute the process on the switch 10 instead.

<Image of Data>

The image of the data used in the present invention will be described below.

[Policy DB: Image of Topology Information]

Figure 9:
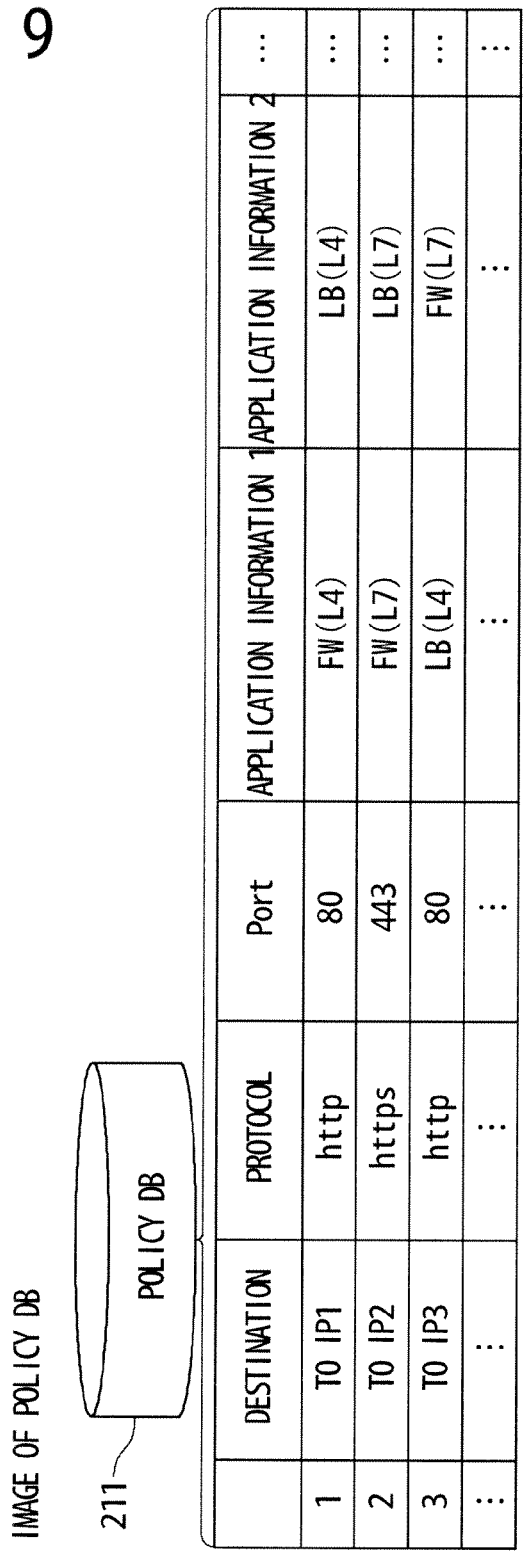
FIG. 9 is a view showing an image of a policy DB.

FIG. 9 is the image of the topology information stored in the policy DB 211.

The topology information has a destination address, a protocol, a port number and variety of application information.

The destination address is an IP address of a transmission destination (destination). The protocol is information that indicates classification of protocols, such as [http], [https], [FTP] or the like. The port number is a sub (auxiliary) address provided below the IP address such as, [80], [443] or the like. The various application information are information, which indicates the firewall (FW) function, the load balancer (LB) function, and whether a hierarchy (layer) where these are driven is the L4 (layer 4) level or L7 (layer 7).

The operating system (OS) 21 in the controller 20, when receiving a packet, refers to the policy DB 211, notifies to the suitable firewall (FW) function and load balancer (LB) function in the suitable hierarchy.

[Image of Flow Table]

FIG. 10 is the image of the flow table, such as the flow table 111, the flow table 321 and the flow table 331 and the like.

The flow table has a processing flag, (1) transmission source IP, (2) transmission source port, (3) destination IP, (4) destination port, (5) payload and (6) action.

Here, (1) source IP to (5) payload are items used as the rule of the flow.

The processing flag is a flag that indicates which of (1) source IP to (5) payload is referred as the rule of the flow. That is, the item(s) set for the processing flag is employed as the rule of the flow.

As for (1) source IP, (2) source Port, (3) destination IP and (4) destination Port, their descriptions are omitted.

Here, (5) payload corresponds to a user data portion of the received data. For example, (5) payload stores a part or all of respective information of "URL (Uniform Resource Locator)", "Cookie Information", "Script" and the like.

In addition, (6) action indicates processing which is performed on the received packet, when all of the items set for the processing flag (condition of the processing flag) are satisfied. For example, the processing such as "pass", "discard" and the like are set for (6) action.

The switch 10, the controller 20 and the frontend processor (FEP) 30 refer to an appropriate field of the header information of the received packet, for the item(s) set for the processing flag (the condition of the process flag). If it matches (coincides) with the information registered in the flow table, they execute the processing set for (6) action corresponding to the processing flag.

As the processing of the highest rank, the switch 10, the controller 20 and the frontend processor (FEP) 30 allow the passage of the packet, if it matches with all of (1) source IP to (5) payload.

As the processing of the lowest rank, the switch 10, the controller 20 and the frontend processor (FEP) 30 unconditionally discard the packet, if it does not match with any of (1) source IP to (5) payload.

[Image of Query Packet]

Figure 11:
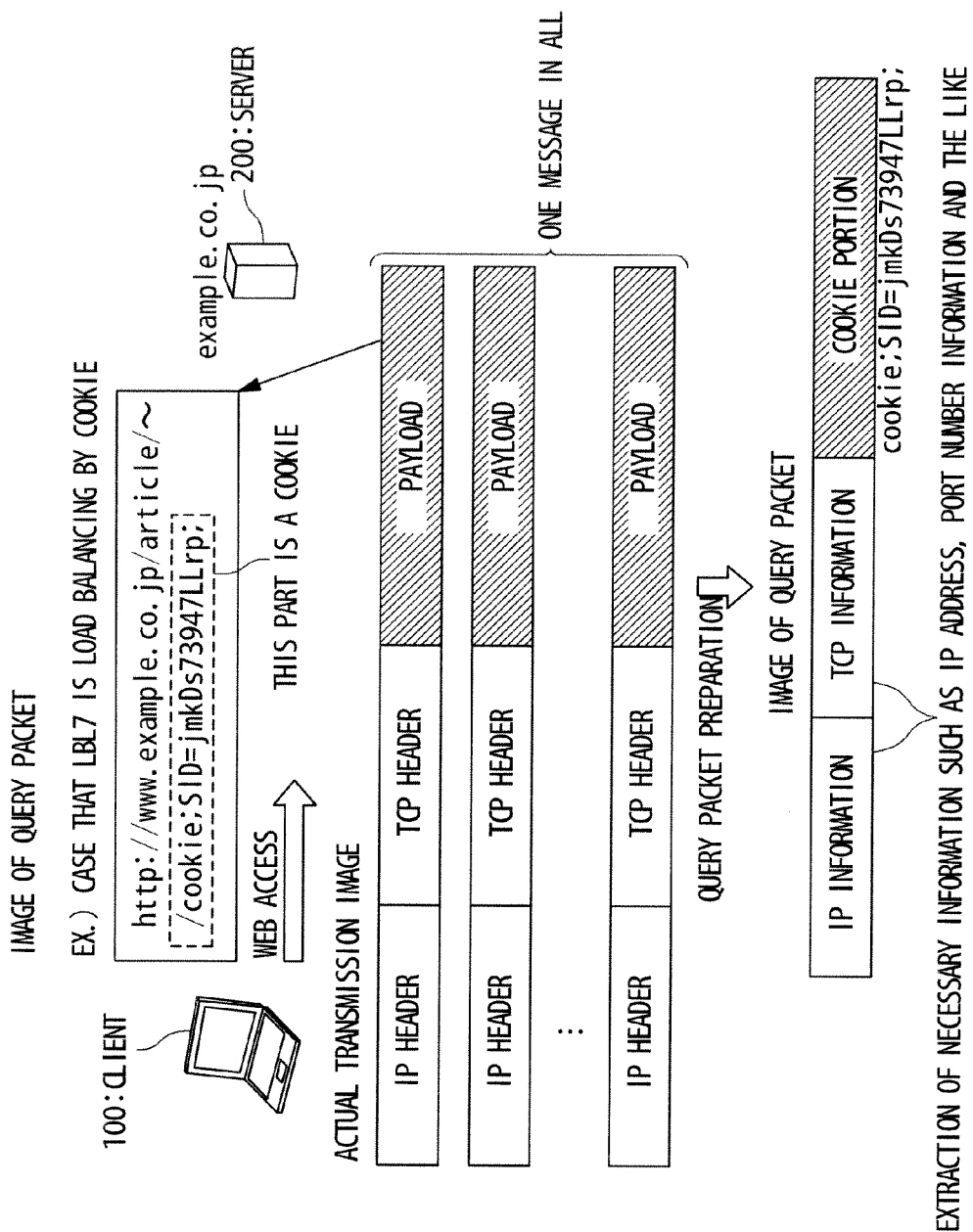
FIG. 11 is a view showing an image of a query packet.

FIG. 11 is the image of the query packet.

As an actual propagation image, a usual packet has an IP header, a TCP header and a payload. In a current network system, a long data is divided into a plurality of packets each having a predetermined data length and transmitted. The data divided at the predetermined data length are stored in the payload. That is, there are packets, where the number of the packets is equal to the number of the divided data. The entire data stored in the payloads of the packet group becomes one message. Also, the packets belonging to the packet group have the same transmission source and destination. Thus, all of the information stored in the IP header and the TCP header become identical.

The query packet has IP information, TCP information and a payload. Only necessary information, such as the IP address, the port number and the like, extracted from the IP header and the TCP header of the usual packet is stored in the IP information and the TCP information. Also, only necessary information extracted from one message restored from the divided data is stored in the payload. For example, in a Web access, the URL is composed of a kind of information, a server name, a port number, a folder name, a file name, cookie information and the like. Then, the URL is divided at a predetermined data length and stored in the usual packet. When only the cookie information in the URL is required, only the cookie information is extracted from the URL once restored from the packet group and stored in the payload of the query packet.

<Image of Load Balancing>

The image of the load balancing performed in the present invention will be described below.

[Load Balancing Between FEP and FEP]

Figure 12:
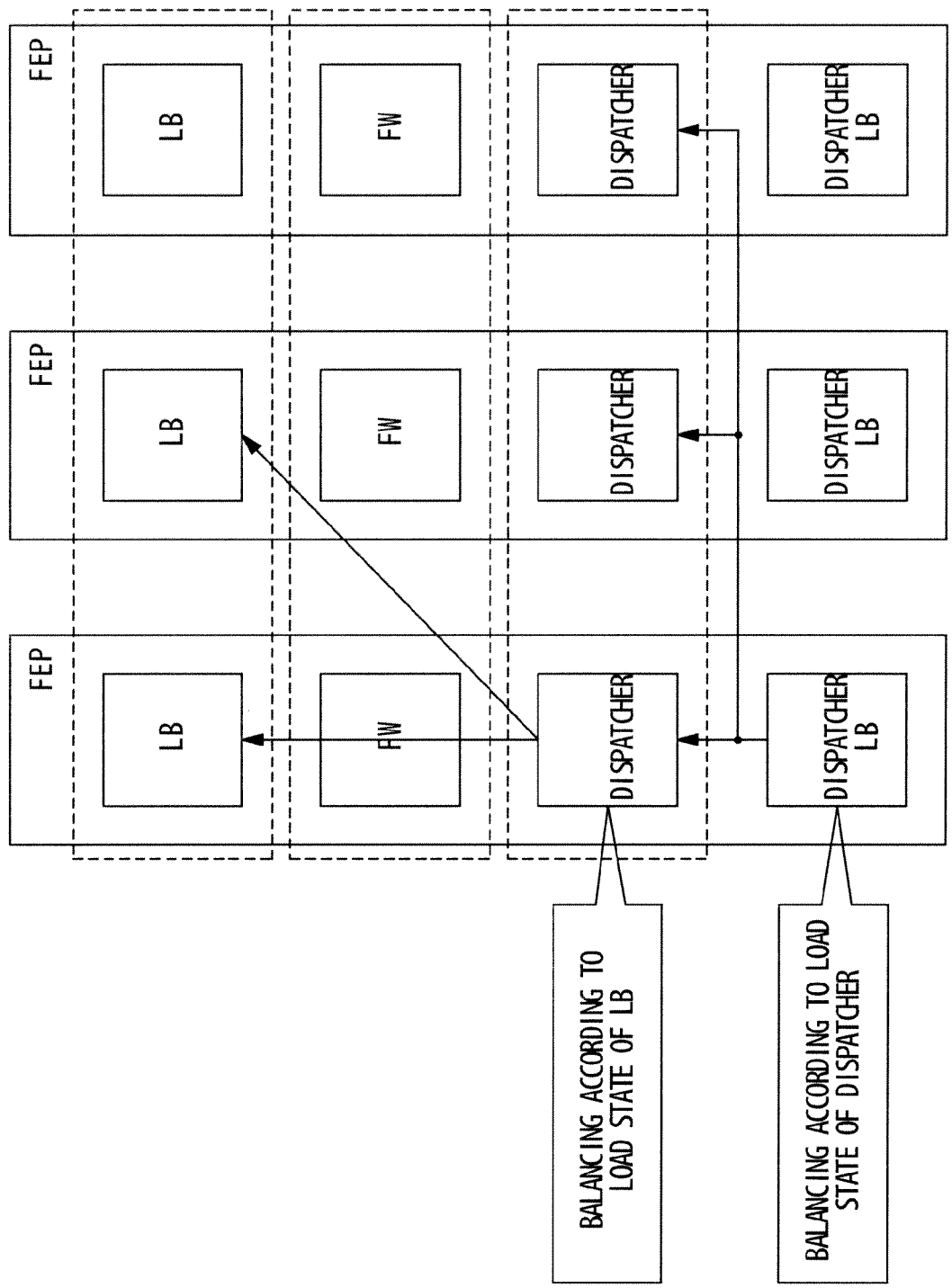
FIG. 12 is a view showing an image of a balancing processing through an FEP.

FIG. 12 is the image of the load balancing between the FEP and the FEP.

Here, three frontend processors (FEPs) are shown. The individual frontend processor (FEP) includes a dispatcher load balancer (dispatcher LB), a dispatcher, a firewall (FW) and a load balancer (LB). However, an actual case is not limited to those examples.

The dispatcher load balancer (dispatcher LB) looks into the load state of the dispatcher of each FEP, performs the load balancing and assigns processing to the dispatcher of a suitable FEP. The dispatcher load balancer (dispatcher LB) may be the load balancer (LB) of its own FEP or the other's FEP. Incidentally, in FIG. 12, the frontend processor (FEP) includes the dispatcher load balancer (dispatcher LB). Actually, the dispatcher load balancer (dispatcher LB) may be the load balancer (LB) 13 of the switch 10 or the load balancer (LB) 23 of the controller 20, which are shown in FIG. 3.

The dispatcher, the firewall (FW) and the load balancer (LB) are the same as the dispatcher 31, the firewall (FW) 32 and the load balancer (LB) 33, respectively, which are shown in FIG. 3.

The dispatcher looks into the load states of the firewall (FW) and the load balancer (LB) in each FEP, performs the load balancing and assigns processing to the firewall (FW) or load balancer (LB) in a suitable FEP.

Incidentally, the dispatcher looks into the load states, not in units of a firewall (FW) or a load balancer (LB), but in units of hardware of each FEP, and starts up a necessary functional module, such as a firewall (FW), a load balancer (LB) or the like, in an FEP of the relatively low load.

[Load Balancing Between Controller and FEP]

Incidentally, in the above-mentioned exemplary embodiments and the respective examples, the frontend processor (FEP) 30 that transmits the 1st query packet to the controller 20 and the frontend processor (FEP) 30 that receives the answer from the controller 20 are not always the same. This is because there is a possibility that an FEP differing from the FEP of the transmission source is selected, as an FEP to be subsequently used by the load balancer (LB) 23 in the controller 20.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-017960, the disclosure of Japanese patent application No. 2010-017960 is incorporated herein in its entirety by reference.

The invention claimed is:

1. A frontend system comprising:
a switch configured to relay a packet;
a controller configured to determine a new communication route by controlling said switch; and
a frontend hardware processor configured to be connected through said switch to the controller,
wherein said frontend hardware processor includes:
a dispatcher configured to collect said packet, prepare a query packet corresponding to a protocol of a layer 7 level by extracting only necessary information from a collected packet group, perform a policy check on said query packet based on an application policy and transmit said query packet to a destination,
a firewall configured to recognize a protocol of a layer 7 level and determine whether said query packet is allowed to be passed, and
a load balancer configured to recognize a protocol of a layer 7 level, perform load balancing of said query packet based on a load state of a network, transmit said query packet to said controller through said switch if said query packet is a first query packet and checks a route of said query packet.

2. The frontend system according to claim 1, wherein said dispatcher looks into load states in units of hardware of each of a plurality of frontend processors including said frontend hardware processor, performs a processing of starting up said firewall and said load balancer on an optimal frontend processor and transmits said query packet to said firewall and said load balancer.

3. The frontend system according to claim 1, wherein said controller receives said query packet from said frontend hardware processor, looks into load states in units of hardware of each of a plurality of frontend processors including said frontend hardware processor, and returns said query packet to an optimal frontend processor.

4. The frontend system according to claim 1, wherein said switch includes:
a port configured to transmit said packet to said controller when said packet is a first packet, check a rule and action for said packet, and transfer said packet based on said rule and action for said packet,
a layer 4 firewall configured to recognize a protocol of a layer 4 level and determine whether said packet is allowed to be passed, and
a layer 4 load balancer configured to recognize a protocol of a layer 4 level and perform load balancing of said packet based on a load state of the network, and
wherein said switch drives both said layer 4 firewall and said layer 4 load balancer, determines whether said packet is allowed to be passed, performs load balancing of said packet, and does not transfer said packet to said frontend hardware processor.

5. The frontend system according to claim 1, wherein said frontend hardware processor terminates a session of a TCP (transmission control protocol) through said switch, collects said packet, prepares said query packet by extracting only necessary information from a collected packet group, and transmits said query packet to said controller, and
wherein said controller includes:
an operating system (OS) configured to receive said packet from said switch, determine a rule and action for said packet with reference to topology information of the whole network, and notify it to said switch,
a layer 7 firewall configured to recognize a protocol of a layer 7 level and determine whether said query packet is allowed to be passed, and
a layer 7 load balancer configured to recognize a protocol of a layer 7 level, and perform load balancing of said query packet based on a load state of the network.

6. The frontend system according to claim 1, wherein said switch includes:
a port configured to transmit said packet to said controller when said packet is a first packet, check a rule and action for said packet, and transfer said packet based on said rule and action for said packet, and
a layer 4 load balancer configured to recognize a protocol of a layer 4 level and perform load balancing of said packet based on a load state of the network,
wherein said controller includes:
an operating system (OS) configured to receive said packet from said switch, determine a rule and action for said packet with reference to topology information of a whole of the network, and notify it to said switch, and
a layer 7 firewall configured to recognize a protocol of a layer 7 level and determine whether said query packet is allowed to be passed,
wherein said switch drives said layer 4 load balancer, changes the route of said packet to a route passing through said frontend hardware processor , and transmits said packet to said frontend hardware processor , and
wherein said controller receives said query packet from said frontend hardware processor , drives said layer 7 firewall, and determines whether said query packet is allowed to be passed.

7. The frontend system according to claim 1, wherein said controller includes:
a layer 4 firewall configured to recognize a protocol of a layer 4 level, receive said packet from said switch, determine whether said packet is allowed to be passed, and when a passage of said packet is limited, discard said packet and notify said switch of an instruction of discarding a packet with a rule which is the same as that of said packet, an operating system (OS) configured to refer to topology information of a whole of the network, receive said packet from said layer 4 firewall, receive said packet from said switch, determine a rule and action for said packet, and notify it to said switch, and a layer 7 load balancer configured to recognize a protocol of a layer 7 level, receive said query packet from said frontend hardware processor, and perform load balancing of said query packet, wherein said frontend hardware processor terminates a session of a TCP (transmission control protocol) through said switch, collects said packet, prepares said query packet by extracting only necessary information from a collected packet group, and transmits said query packet to said controller.

8. A switch in a frontend system, wherein said frontend system includes:

said switch configured to relay a packet, a controller configured to determine a new communication route by controlling said switch, and a frontend hardware processor configured to be connected through said switch to the controller, wherein said frontend hardware processor includes:

a dispatcher configured to collect said packet, prepare a query packet corresponding to a protocol of a layer 7 level by extracting only necessary information from a collected packet group, perform a policy check on said query packet based on an application policy and transmit said query packet to a destination, a firewall configured to recognize a protocol of a layer 7 level and determine whether said query packet is allowed to be passed, and a load balancer configured to recognize a protocol of a layer 7 level, perform load balancing of said query packet based on a load state of a network, transmit said query packet to said controller through said switch if said query packet is a first query packet and checks a route of said query packet, said switch comprising:

a port configured to transmit said packet to said controller when said packet is a first packet, check a rule and action for said packet, and transfer said packet based on said rule and action for said packet;

a layer 4 firewall configured to recognize a protocol of a layer 4 level and determine whether said packet is allowed to be passed; and a layer 4 load balancer configured to recognize a protocol of a layer 4 level and perform load balancing of said packet based on a load state of the network, wherein said switch drives both said layer 4 firewall and said layer 4 load balancer, determines whether said packet is allowed to be passed, performs load balancing of said packet, and does not transfer said packet to said frontend hardware processor.

9. A frontend processing method comprising:

connecting a frontend hardware processor through a switch which relays a packet to a controller which determines a new communication route by controlling the switch;

collecting said packet and preparing a query packet corresponding to a protocol of a layer 7 level by extracting only necessary information form a collected packet group, by a dispatcher on said frontend hardware processor;

determining whether said query packet is allowed to be passed, by a firewall which recognizes a protocol of a layer 7 level on said frontend hardware processor;

performing load balancing of said query packet based on a load state of a network, transmitting said query packet to said controller through said switch if said query packet is a first query packet and checking a route of said query packet, by a load balancer which recognizes a protocol of a layer 7 level on said frontend hardware processor; and performing a policy check on said query packet based on an application policy and transmitting said query packet to a destination, by said dispatcher on said frontend hardware processor.

10. The frontend processing method according to claim 9, further comprising:

looking into load states in units of hardware of each of a plurality of frontend processors including said frontend hardware processor, performing a processing of starting up said firewall and said load balancer on an optimal frontend processor and transmitting said query packet to said firewall and said load balancer, by said dispatcher on said frontend hardware processor.

11. The frontend processing method according to claim 9, further comprising:

receiving said query packet from said frontend hardware processor, looking into load states in units of hardware of each of a plurality of frontend processors including said frontend hardware processor, and returning said query packet to an optimal frontend processor, by said controller.

12. The frontend processing method according to claim 9, further comprising:

transmitting said packet to said controller when said packet is a first packet, checking a rule and action for said packet, and transferring said packet based on said rule and action for said packet, by said switch, determining whether said packet is allowed to be passed, by a layer 4 firewall recognizing a protocol of a layer 4 level on said switch, performing load balancing of said packet based on a load state of the network, by a layer 4 load balancer recognizing a protocol of a layer 4 level, and driving both said layer 4 firewall and said layer 4 load balancer, determining whether said packet is allowed to be passed, performing load balancing of said packet, and not transferring said packet to said frontend hardware processor, by said switch.

13. The frontend processing method according to claim 9, further comprising:

receiving said packet from said switch, determining a rule and action for said packet with reference to topology information of a whole of the network, and notifying it to said switch, by an operating system (OS) on said controller, terminating a session of a TCP (transmission control protocol) through said switch, collecting said packet, preparing said query packet by extracting only necessary information from a collected packet group, and transmitting said query packet to said controller, by said frontend hardware processor , and determining whether said query packet is allowed to be passed, by a layer 7 firewall recognizing a protocol of a layer 7 level on said controller, and performing load balancing of said query packet based on a load state of the network, by a layer 7 load balancer recognizing a protocol of a layer 7 level on said controller.

14. The frontend processing method according to claim 9, further comprising:
transmitting said packet to said controller when said packet is a first packet, checking a rule and action for said packet, and transferring said packet based on said rule and action for said packet, by said switch,
receiving said packet from said switch, determining a rule and action for said packet with reference to topology information of a whole of the network, and notifying it to said switch, by an operating system (OS) on said controller,
performing load balancing of said packet based on a load state of the network, by a layer 4 load balancer recognizing a protocol of a layer 4 level on said switch,
driving said layer 4 load balancer, changing the route of said packet to a route passing through said frontend hardware processor, and transmitting said packet to said frontend hardware processor, by said switch,
receiving said query packet from said frontend hardware processor, by said controller, and
determining whether said query packet is allowed to be passed, by a layer 7 firewall recognizing a protocol of a layer 7 level on the controller.

15. The frontend processing method according to claim 9, further comprising:
receiving said packet from said switch, determining whether said packet is allowed to be passed, and when a passage of said packet is limited, discarding said packet and notifying said switch of an instruction of discarding a packet with a rule which is the same as that of said packet, by a layer 4 firewall recognizing a protocol of a layer 4 level on said controller,
referring to topology information of a whole of the network, receiving said packet from said layer 4 firewall, receiving said packet from said switch, determining a rule and action for said packet, and notify it to said switch, by an operating system (OS) on said controller,
terminating a session of a TCP (transmission control protocol) through said switch, collecting said packet, preparing said query packet by extracting only necessary information from a collected packet group, and transmitting said query packet to said controller, by said frontend hardware processor, and
receiving said query packet from said frontend hardware processor, and performing load balancing of said query packet, by a layer 7 load balancer recognizing a protocol of a layer 7 level on said controller.

16. A non-transitory recording medium which records a computer program for executing a part of frontend processing method by a frontend system comprising a switch, a controller and a frontend hardware processor which is connected through a switch which relays a packet to a controller which determines a new communication route by controlling the switch,
wherein said frontend processing method includes:
collecting said packet and preparing a query packet corresponding to a protocol of a layer 7 level by extracting only necessary information form a collected packet group, by a dispatcher on said frontend hardware processor,
determining whether said query packet is allowed to be passed, by a firewall which recognizes a protocol of a layer 7 level on said frontend hardware processor,
performing load balancing of said query packet based on a load state of a network, transmitting said query packet to said controller through said switch if said query packet is a first query packet and checking a route of said query packet, by a load balancer which recognizes a protocol of a layer 7 level on said frontend hardware processor, and
performing a policy check on said query packet based on an application policy and transmitting said query packet to a destination, by said dispatcher on said frontend hardware processor,
said computer program comprising code operable to control a computer as said switch, the code comprising:
transmitting said packet to said controller when said packet is a first packet, checking a rule and action for said packet, and transferring said packet based on said rule and action for said packet;
determining whether said packet is allowed to be passed, by a layer 4 firewall recognizing a protocol of a layer 4 level;
performing load balancing of said packet based on a load state of the network, by a layer 4 load balancer recognizing a protocol of a layer 4 level; and
driving both said layer 4 firewall and said layer 4 load balancer, determining whether said packet is allowed to be passed, performing load balancing of said packet, and not transferring said packet to said frontend hardware processor.

17. A switch in a frontend system, wherein said frontend system includes:
said switch configured to relay a packet,
a controller configured to determine a new communication route by controlling said switch, and
a frontend hardware processor configured to be connected through said switch to the controller,
wherein said frontend hardware processor includes:
a dispatcher configured to collect said packet, prepare a query packet corresponding to a protocol of a layer 7 level by extracting only necessary information from a collected packet group, perform a policy check on said query packet based on an application policy and transmit said query packet to a destination,
a firewall configured to recognize a protocol of a layer 7 level and determine whether said query packet is allowed to be passed, and
a load balancer configured to recognize a protocol of a layer 7 level, perform load balancing of said query packet based on a load state of a network, transmit said query packet to said controller through said switch if said query packet is a first query packet and checks a route of said query packet,
said switch comprising:
a port configured to transmit said packet to said controller when said packet is a first packet, check a rule and action for said packet, and transfer said packet based on said rule and action for said packet; and
a layer 4 load balancer configured to recognize a protocol of a layer 4 level and perform load balancing of said packet based on a load state of the network,
wherein said controller includes:
an operating system (OS) configured to receive said packet from said switch, determine a rule and action for said packet with reference to topology information of a whole of the network, and notify it to said switch, and
a layer 7 firewall configured to recognize a protocol of a layer 7 level and determine whether said query packet is allowed to be passed, wherein said switch drives said layer 4 load balancer, changes the route of said packet to a route passing through said frontend hardware processor, and transmits said packet to said frontend hardware processor, and wherein said controller receives said query packet from said frontend hardware processor, drives said layer 7 firewall, and determines whether said query packet is allowed to be passed.

18. A controller in a frontend system, wherein said frontend system includes:

a switch configured to relay a packet, said controller configured to determine a new communication route by controlling said switch, and a frontend hardware processor configured to be connected through said switch to the controller, wherein said frontend hardware processor includes:

a dispatcher configured to collect said packet, prepare a query packet corresponding to a protocol of a layer 7 level by extracting only necessary information from a collected packet group, perform a policy check on said query packet based on an application policy and transmit said query packet to a destination, a firewall configured to recognize a protocol of a layer 7 level and determine whether said query packet is allowed to be passed, and a load balancer configured to recognize a protocol of a layer 7 level, perform load balancing of said query packet based on a load state of a network, transmit said query packet to said controller through said switch if said query packet is a first query packet and checks a route of said query packet, wherein said frontend hardware processor terminates a session of a TCP (transmission control protocol) through said switch, collects said packet, prepares said query packet by extracting only necessary information from a collected packet group, and transmits said query packet to said controller, said controller comprising:

an operating system (OS) configured to receive said packet from said switch, determine a rule and action for said packet with reference to topology information of a whole of the network, and notify it to said switch;

a layer 7 firewall configured to recognize a protocol of a layer 7 level and determine whether said query packet is allowed to be passed; and a layer 7 load balancer configured to recognize a protocol of a layer 7 level, and perform load balancing of said query packet based on a load state of the network.

19. A controller in a frontend system, wherein said frontend system includes:

a switch configured to relay a packet, said controller configured to determine a new communication route by controlling said switch, and a frontend hardware processor configured to be connected through said switch to the controller, wherein said frontend hardware processor includes:

a dispatcher configured to collect said packet, prepare a query packet corresponding to a protocol of a layer 7 level by extracting only necessary information from a collected packet group, perform a policy check on said query packet based on an application policy and transmit said query packet to a destination, a firewall configured to recognize a protocol of a layer 7 level and determine whether said query packet is allowed to be passed, and a load balancer configured to recognize a protocol of a layer 7 level, perform load balancing of said query packet based on a load state of a network, transmit said query packet to said controller through said switch if said query packet is a first query packet and checks a route of said query packet, wherein said switch includes:

a port configured to transmit said packet to said controller when said packet is a first packet, check a rule and action for said packet, and transfer said packet based on said rule and action for said packet, and a layer 4 load balancer configured to recognize a protocol of a layer 4 level and perform load balancing of said packet based on a load state of the network, said controller comprising:

an operating system (OS) configured to receive said packet from said switch, determine a rule and action for said packet with reference to topology information of a whole of the network, and notify it to said switch; and a layer 7 firewall configured to recognize a protocol of a layer 7 level and determine whether said query packet is allowed to be passed, wherein said switch drives said layer 4 load balancer, changes the route of said packet to a route passing through said frontend hardware processor, and transmits said packet to said frontend hardware processor, and wherein said controller receives said query packet from said frontend hardware processor, drives said layer 7 firewall, and determines whether said query packet is allowed to be passed.

20. A controller in a frontend system, wherein said frontend system includes:

a switch configured to relay a packet, said controller configured to determine a new communication route by controlling said switch, and a frontend hardware processor configured to be connected through said switch to the controller, wherein said frontend hardware processor includes:

a dispatcher configured to collect said packet, prepare a query packet corresponding to a protocol of a layer 7 level by extracting only necessary information from a collected packet group, perform a policy check on said query packet based on an application policy and transmit said query packet to a destination, a firewall configured to recognize a protocol of a layer 7 level and determine whether said query packet is allowed to be passed, and a load balancer configured to recognize a protocol of a layer 7 level, perform load balancing of said query packet based on a load state of a network, transmit said query packet to said controller through said switch if said query packet is a first query packet and checks a route of said query packet, said controller comprising:

a layer 4 firewall configured to recognize a protocol of a layer 4 level, receive said packet from said switch, determine whether said packet is allowed to be passed, and when a passage of said packet is limited, discard said packet and notify said switch of an instruction of discarding a packet with a rule which is the same as that of said packet;

an operating system (OS) configured to refer to topology information of a whole of the network, receive said packet from said layer 4 firewall, receive said packet from said switch, determine a rule and action for said packet, and notify it to said switch; and a layer 7 load balancer configured to recognize a protocol of a layer 7 level, receive said query packet from said frontend hardware processor, and perform load balancing of said query packet, wherein said frontend hardware processor terminates a session of a TCP (transmission control protocol) through said switch, collects said packet, prepares said query packet by extracting only necessary information from a collected packet group, and transmits said query packet to said controller.

21. A frontend hardware processor in a frontend system, wherein said frontend system includes:
a switch configured to relay a packet,
a controller configured to determine a new communication route by controlling said switch, and
said frontend hardware processor configured to be connected through said switch to the controller,
said frontend hardware processor comprising:
a dispatcher configured to collect said packet, prepare a query packet corresponding to a protocol of a layer 7 level by extracting only necessary information from a collected packet group, perform a policy check on said query packet based on an application policy and transmit said query packet to a destination;
a firewall configured to recognize a protocol of a layer 7 level and determine whether said query packet is allowed to be passed; and
a load balancer configured to recognize a protocol of a layer 7 level, perform load balancing of said query packet based on a load state of a network, transmit said query packet to said controller through said switch if said query packet is a first query packet and checks a route of said query packet.

22. The frontend hardware processor according to claim 21, wherein said dispatcher looks into load states in units of hardware of each of a plurality of frontend processors including said frontend hardware processor, performs a processing of starting up said firewall and said load balancer on an optimal frontend processor and transmits said query packet to said firewall and said load balancer.

23. A non-transitory recording medium which records a computer program for executing a part of frontend processing method by a frontend system comprising a switch, a controller and a frontend hardware processor which is connected through a switch which relays a packet to a controller which determines a new communication route by controlling the switch,
wherein said frontend processing method includes:
collecting said packet and preparing a query packet corresponding to a protocol of a layer 7 level by extracting only necessary information form a collected packet group, by a dispatcher on said frontend hardware processor,
determining whether said query packet is allowed to be passed, by a firewall which recognizes a protocol of a layer 7 level on said frontend hardware processor,
performing load balancing of said query packet based on a load state of a network, transmitting said query packet to said controller through said switch if said query packet is a first query packet and checking a route of said query packet, by a load balancer which recognizes a protocol of a layer 7 level on said frontend hardware processor, and
performing a policy check on said query packet based on an application policy and transmitting said query packet to a destination, by said dispatcher on said frontend hardware processor,
said computer program comprising code operable to control a computer as said switch, the code comprising:
transmitting said packet to said controller when said packet is a first packet, checking a rule and action for said packet, and transferring said packet based on said rule and action for said packet;
after an operating system (OS) of said controller receives said packet from said switch, determines a rule and action for said packet with reference to topology information of a whole of the network, and notifies it to said switch, performing load balancing of said packet based on a load state of the network, by a layer 4 load balancer recognizing a protocol of a layer 4 level; and
driving said layer 4 load balancer, changing the route of said packet to a route passing through said frontend hardware processor, and transmitting said packet to said frontend hardware processor,
wherein said controller receives said query packet from said frontend hardware processor, and
a layer 7 firewall recognizing a protocol of a layer 7 level on the controller determines whether said query packet is allowed to be passed.

24. A non-transitory recording medium which records a computer program for executing a part of frontend processing method by a frontend system comprising a switch, a controller and a frontend hardware processor which is connected through a switch which relays a packet to a controller which determines a new communication route by controlling the switch,
wherein said frontend processing method includes:
collecting said packet and preparing a query packet corresponding to a protocol of a layer 7 level by extracting only necessary information form a collected packet group, by a dispatcher on said frontend hardware processor,
determining whether said query packet is allowed to be passed, by a firewall which recognizes a protocol of a layer 7 level on said frontend hardware processor,
performing load balancing of said query packet based on a load state of a network, transmitting said query packet to said controller through said switch if said query packet is a first query packet and checking a route of said query packet, by a load balancer which recognizes a protocol of a layer 7 level on said frontend hardware processor, and
performing a policy check on said query packet based on an application policy and transmitting said query packet to a destination, by said dispatcher on said frontend hardware processor,
said computer program comprising code operable to control a computer as said controller, the code comprising:
receiving said packet from said switch, determining a rule and action for said packet with reference to topology information of a whole of the network, and notifying it to said switch, by an operating system (OS);
after said frontend hardware processor terminates a session of a TCP (transmission control protocol) through said switch, collects said packet, prepares said query packet by extracting only necessary information from a collected packet group, and transmits said query packet to said controller, determining whether said query packet is allowed to be passed, by a layer 7 firewall recognizing a protocol of a layer 7 level; and
performing load balancing of said query packet based on a load state of the network, by a layer 7 load balancer recognizing a protocol of a layer 7 level.

25. A non-transitory recording medium which records a computer program for executing a part of frontend processing method by a frontend system comprising a switch, a controller and a frontend hardware processor which is connected through a switch which relays a packet to a controller which determines a new communication route by controlling the switch, wherein said frontend processing method includes:

collecting said packet and preparing a query packet corresponding to a protocol of a layer 7 level by extracting only necessary information form a collected packet group, by a dispatcher on said frontend hardware processor, determining whether said query packet is allowed to be passed, by a firewall which recognizes a protocol of a layer 7 level on said frontend hardware processor, performing load balancing of said query packet based on a load state of a network, transmitting said query packet to said controller through said switch if said query packet is a first query packet and checking a route of said query packet, by a load balancer which recognizes a protocol of a layer 7 level on said frontend hardware processor, and performing a policy check on said query packet based on an application policy and transmitting said query packet to a destination, by said dispatcher on said frontend hardware processor, said computer program comprising code operable to control a computer as said controller, the code comprising:

after said switch transmits said packet to said controller when said packet is a first packet, checks a rule and action for said packet, and transfers said packet based on said rule and action for said packet, receiving said packet from said switch, determining a rule and action for said packet with reference to topology information of a whole of the network, and notifying it to said switch, by an operating system (OS);

after said switch performs load balancing of said packet based on a load state of the network, by a layer 4 load balancer recognizing a protocol of a layer 4 level, drives said layer 4 load balancer, changes the route of said packet to a route passing through said frontend hardware processor, and transmits said packet to said frontend hardware processor, receiving said query packet from said frontend hardware processor; and determining whether said query packet is allowed to be passed, by a layer 7 firewall recognizing a protocol of a layer 7 level.

26. A non-transitory recording medium which records a computer program for executing a part of frontend processing method by a frontend system comprising a switch, a controller and a frontend hardware processor which is connected through a switch which relays a packet to a controller which determines a new communication route by controlling the switch, wherein said frontend processing method includes:

collecting said packet and preparing a query packet corresponding to a protocol of a layer 7 level by extracting only necessary information form a collected packet group, by a dispatcher on said frontend hardware processor, determining whether said query packet is allowed to be passed, by a firewall which recognizes a protocol of a layer 7 level on said frontend hardware processor, performing load balancing of said query packet based on a load state of a network, transmitting said query packet to said controller through said switch if said query packet is a first query packet and checking a route of said query packet, by a load balancer which recognizes a protocol of a layer 7 level on said frontend hardware processor, and performing a policy check on said query packet based on an application policy and transmitting said query packet to a destination, by said dispatcher on said frontend hardware processor, said computer program comprising code operable to control a computer as said controller, the code comprising:

receiving said packet from said switch, determining whether said packet is allowed to be passed, and when a passage of said packet is limited, discarding said packet and notifying said switch of an instruction of discarding a packet with a rule which is the same as that of said packet, by a layer 4 firewall recognizing a protocol of a layer 4 level;

referring to topology information of a whole of the network, receiving said packet from said layer 4 firewall, receiving said packet from said switch, determining a rule and action for said packet, and notify it to said switch, by an operating system (OS); and after said frontend hardware processor terminates a session of a TCP (transmission control protocol) through said switch, collects said packet, prepares said query packet by extracting only necessary information from a collected packet group, and transmits said query packet to said controller, receiving said query packet from said frontend hardware processor, and performing load balancing of said query packet, by a layer 7 load balancer recognizing a protocol of a layer 7 level on said controller.

27. A non-transitory recording medium which records a computer program for executing a part of frontend processing method by a frontend system comprising a switch, a controller and a frontend hardware processor which is connected through a switch which relays a packet to a controller which determines a new communication route by controlling the switch, said computer program comprising code operable to control a computer as said frontend hardware processor, the code comprising:

collecting said packet and preparing a query packet corresponding to a protocol of a layer 7 level by extracting only necessary information form a collected packet group, by a dispatcher;

determining whether said query packet is allowed to be passed, by a firewall which recognizes a protocol of a layer 7 level;

performing load balancing of said query packet based on a load state of a network, transmitting said query packet to said controller through said switch if said query packet is a first query packet and checking a route of said query packet, by a load balancer which recognizes a protocol of a layer 7 level; and performing a policy check on said query packet based on an application policy and transmitting said query packet to a destination, by said dispatcher.

28. The non-transitory recording medium according to claim 27, the code further comprising:

looking into load states in units of hardware of each of a plurality of frontend processors including said frontend hardware processor, performing a processing of starting up said firewall and said load balancer on an optimal frontend processor and transmitting said query packet to said firewall and said load balancer, by said dispatcher.

* * * * *